(12) United States Patent
Achour

(10) Patent No.: US 11,451,944 B2
(45) Date of Patent: Sep. 20, 2022

(54) IN-VEHICLE COMMUNICATION SYSTEM

(71) Applicant: Metawave Corporation, Carlsbad, CA (US)

(72) Inventor: Maha Achour, Encinitas, CA (US)

(73) Assignee: MEAWAVE Corporation, Carlsbad, CA (US)

( * ) Notice: Subject to any disclaimer, the term of this patent is extended or adjusted under 35 U.S.C. 154(b) by 0 days.

(21) Appl. No.: 16/983,808

(22) Filed: Aug. 3, 2020

(65) Prior Publication Data

US 2021/0058754 A1 Feb. 25, 2021

Related U.S. Application Data

(60) Provisional application No. 62/882,443, filed on Aug. 2, 2019.

(51) Int. Cl.
*H04Q 11/00* (2006.01)
*H04W 4/48* (2018.01)
*H04B 7/155* (2006.01)

(52) U.S. Cl.
CPC ............. *H04W 4/48* (2018.02); *H04B 7/155* (2013.01)

(58) Field of Classification Search
CPC ... H04W 4/40; H01Q 1/28; G01S 2013/0254; G01S 7/003; G01S 13/42
See application file for complete search history.

(56) References Cited

U.S. PATENT DOCUMENTS

| | | | |
|---|---|---|---|
| 2007/0087695 A1* | 4/2007 | Cohen ................ | H04W 40/18 455/63.4 |
| 2017/0105101 A1* | 4/2017 | Santavicca ........... | H04W 4/023 |
| 2017/0352952 A1* | 12/2017 | Weiler ................. | H01Q 3/46 |
| 2018/0166781 A1* | 6/2018 | Snyder ................ | H01Q 5/357 |
| 2019/0020402 A1* | 1/2019 | Gharavi .............. | H04B 7/15528 |
| 2020/0112087 A1* | 4/2020 | Kulkarni ............. | H01Q 21/205 |
| 2020/0196162 A1* | 6/2020 | Vargas ............... | H04W 74/0833 |
| 2020/0280827 A1* | 9/2020 | Fechtel ............... | H04W 4/44 |
| 2020/0336168 A1* | 10/2020 | Hormis ............... | H03L 7/22 |
| 2020/0403628 A1* | 12/2020 | Spehl ................. | H04W 4/40 |

* cited by examiner

*Primary Examiner* — Khalid W Shaheed
(74) *Attorney, Agent, or Firm* — Sandra Lynn Godsey

(57) ABSTRACT

Examples disclosed herein relate to illustrate an in-vehicle communication system having wireless extension devices, such as an active repeater or an edge reflectarray device. The wireless extension devices operate in coordination to redirect signals within a vehicle.

20 Claims, 17 Drawing Sheets

IN-VEHICLE COMMUNICATION SYSTEM

CROSS-REFERENCE TO RELATED APPLICATIONS

This application claims priority from U.S. Provisional Application No. 62/882,443, titled "IN-VEHICLE COMMUNICATION SYSTEM," filed on Aug. 2, 2019, and incorporated herein by reference in its entirety.

BACKGROUND

Vehicle travel and wireless communications are intersecting in a variety of ways. As we move forward with more capability in vehicles, there are a variety of communications that may prove critical and advantageous.

BRIEF DESCRIPTION OF THE DRAWINGS

The present application may be more fully appreciated in connection with the following detailed description taken in conjunction with the accompanying drawings, which are not drawn to scale and in which like reference characters refer to like parts throughout, and wherein.

DETAILED DESCRIPTION

The present inventions present methods and apparatuses for in-vehicle communication systems and specifically, including a system having an active relay antenna system. The in-vehicle components include a reflectarray to direct a communication signal within the vehicle. The methods and apparatuses provide multiple antenna structures within a vehicle to identify and integrate with base stations (BS) and other network components. In some embodiments the network components form a directed beam network, such as 5G wireless which is a mm wave system requiring deployment of an increased number of nodes, 5G components, as signals are short-range and easily blocked by walls and so forth.

It is appreciated that, in the following description, numerous specific details are set forth to provide a thorough understanding of the examples. However, it is appreciated that the examples may be practiced without limitation to these specific details. In other instances, well-known methods and structures may not be described in detail to avoid unnecessarily obscuring the description of the examples. Also, the examples may be used in combination with each other.

Figure 1:
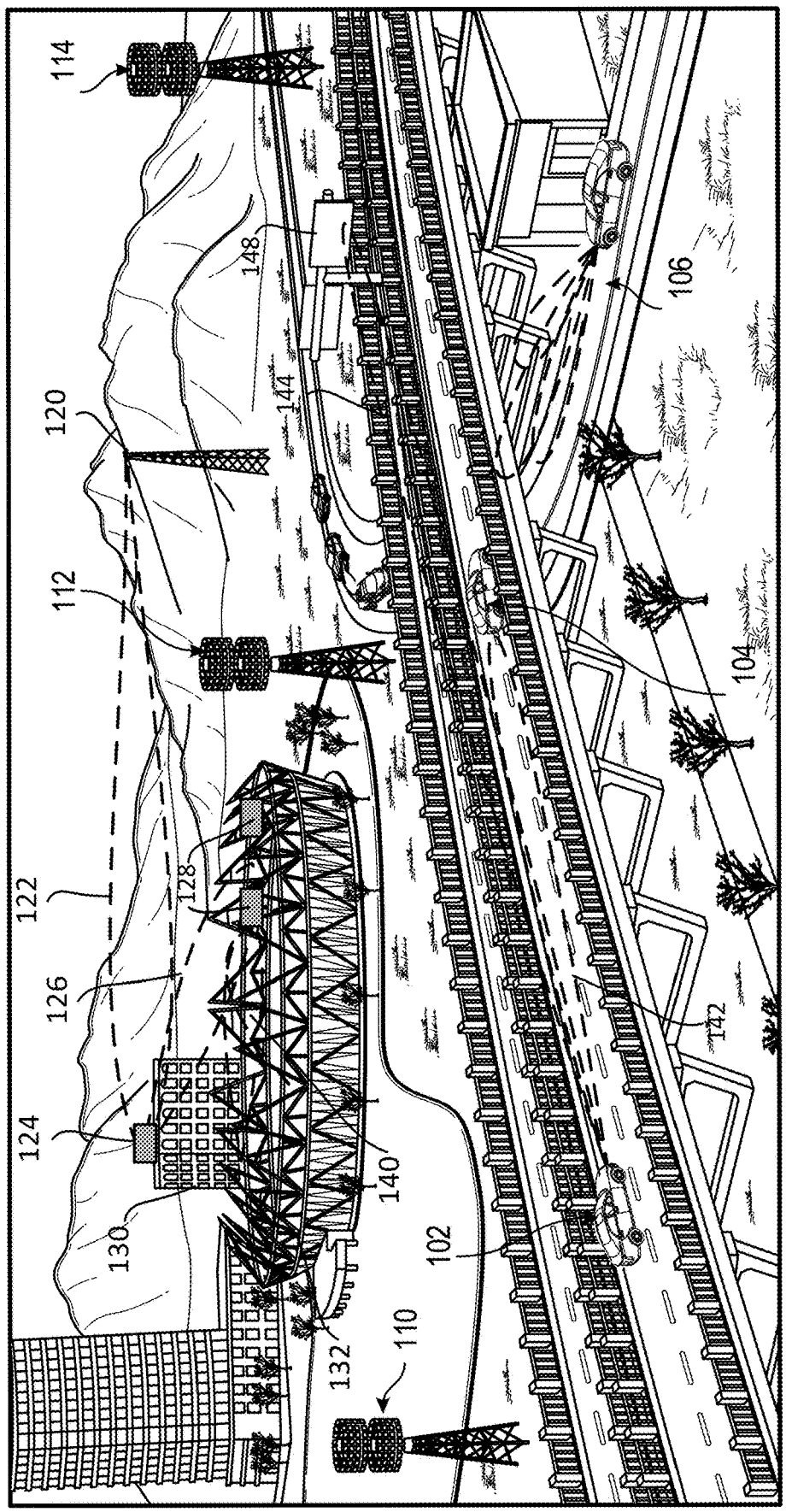
FIG. 1 illustrates a vehicle environment, according to example embodiments of the present inventions.

FIG. 1 illustrates a vehicular environment 100 having roadways, building, natural features, stadiums, and wireless network infrastructure. The vehicles 102, 104, 106 are traveling and pass by multiple BSs, such as BS 110, 112, 114. To communicate with these BSs within the vehicle, the in-vehicle communication system will first detect the BS and then initiate communications. The in-vehicle system of each vehicle may have a variety of components and capabilities. In the present embodiments, multiple edge reflectarrays are positioned around the vehicle to enable communication in a variety of directions without beam steering and other computationally intensive techniques. As the 5G network operates with mm waves of short range, the signal received at the vehicle may have reduced amplitude, and therefore, the ability to capture communication signals from each BS and amplify that signal aids in accurate and reliable communications. The use of reflectarrays to increase the gain of received signals provides usable information to a vehicle radio or communication system. Within the vehicle, the edge reflectarrays, RAs, also transmit information within the vehicle, such as to passive reflectarrays positioned so as to redirect signals to UEs within the vehicle, such as user mobile devices in the rear seats or other locations where an amplified signal is desirable. The BS 112 is illustrated as a 5G network element and referred to as a gNode B. This 5G New Radio (NR) system is illustrated as an example, however, the inventions presented herein are not limited to a specific implementation.

The gNode B 112 is designed to shape and direct individual beams to individual subscribers within a range determined by positioning of the gNode B 112 and the frequency of operation; it then connects to a central network. As illustrated the gNode B 112 implements a form of Multiple Input-Multiple Output (MIMO) using array(s) of antennas to focus and steer multiple beams simultaneously. These beams may be directed at different targets, such as a cell phone, vehicles, infrastructure, WiFi router, health monitors, industrial equipment and so forth. As the NR beams are directional as opposed to omnidirectional as in prior systems, to reach a target the beam may be bounced off of objects, such as reflector or repeaters or other objects in an environment, such as environment 100. To meet ever increasing demands for data and speed these NR and later systems will increase the frequency to achieve these goals. An increased frequency reduces the range of transmissions thus incurring more infrastructure. In addition, this increase in throughput and speed increases the energy consumed by increased processing, both analog and digital, within an NR system, such as at the gNode B 112. The increased energy results in heat and reliability concerns, different from prior systems. While technologies and semiconductor materials continue to develop to address these and other issues, the overall infrastructure will increase to accommodate and ameliorate, where possible, these issues.

As illustrated in FIG. 1, the gNode B 112, and 110, 114, are positioned near roadways and are adapted for communication with vehicles, such as cars 102, 104, 106. They are also positioned to communicate with buildings, stadiums, and other infrastructure in the area, as well as with legacy systems, such as an omnidirectional communication system. As these systems continually develop, these elements within a NR system will become part of the infrastructure and environment, such as embedded in glass windows, building structures, traffic signage and so forth, and may be referred to as smart infrastructure having capability to communicate device-to-device, X2X. The present inventions present vehicles with structures and methods for these communications, including vehicle-to-vehicle, V2V.

In FIG. 1, another BS, gNode B 120, transmits a directional beam 122 to a NR infrastructure element 124 on building 130 to redirect the received beam 122 into a stadium 132 as beam 126. Positioned in the stadium are NR infrastructure elements 128, which redirect beam 126 to areas within the stadium, such as by beam 140. In these and other examples the NR infrastructure elements may be reflectors, repeaters and so forth to facilitate coverage in designated areas and may be repositioned or redirected as desired.

FIG. 1 further includes a vehicle 102 having capability for radar detection, illustrated as beam 142, and for communication with gNode B or infrastructure, such as smart communication-capable signage 148 illustrated by beam 144. During travel, vehicle 102 may communicate with gNode B 11, 112, 114.

Figure 2:
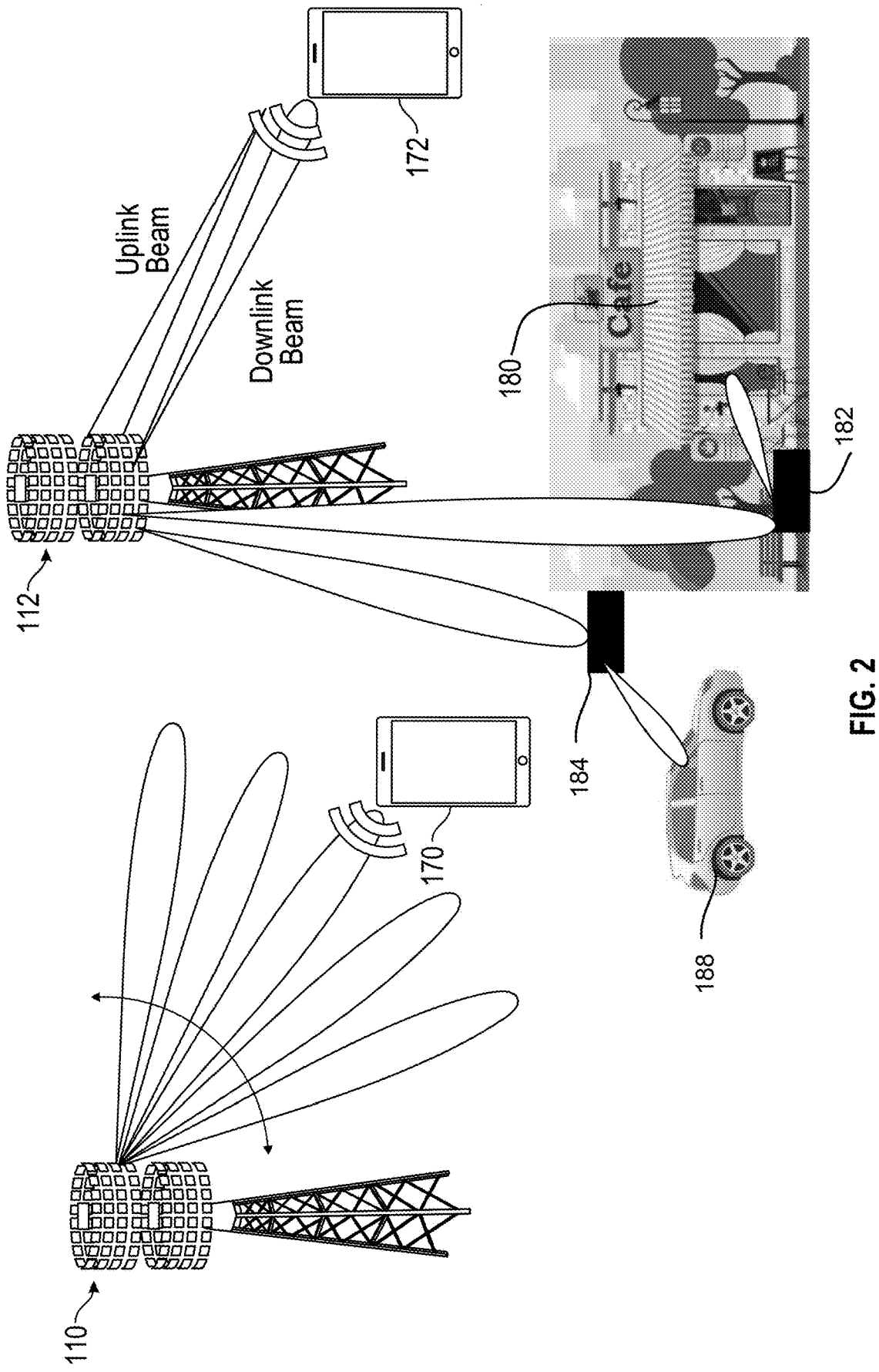
FIG. 2 illustrates a wireless configuration for a 5G type cellular system, according to example embodiments of the present inventions.

FIG. 2 illustrates a 5G NR network having BSs gNode B 110 and gNode B 112 positioned proximate each other and communicating with UEs 170, 172, respectively. In contrast to the omni-directional beam formations of 4G networks, the 5G transmissions are directed beams toward the target communication device or area, such as to the location of a specific UE. The 5G BS includes circuitry and control means to generate directed beams and to change the direction of the beams as needed, beam steering. In addition to the BSs of a 5G network, there are also mini-BSs that act to extend coverage to a variety of areas. There a variety of devices and structures that are used to implement a 5G network, and while the current discussion of FIG. 2 relates to BSs, the in-vehicle communication systems described herein is also applicable to communicate with these other units. benefit from the inventions detailed herein. In these 5G communications, there is a downlink (DL) from the gNode B to a user device (UE) and an uplink (UL) from UE to gNode B. As illustrated, gNode B 112 has UL and DL with UE 172 and gNode B 110 has UL and DL with UE 170.

The gNode B 112 transmits a directed beam to a NR infrastructure element 182 to redirect communications into a café 180. This supports a DL and an UL. Similarly, a vehicle 188 engages in communication with gNode B 112 through a NR infrastructure element 184. As illustrates, the gNode B 112 transmits directed beams in a variety of directions.

Figure 3:
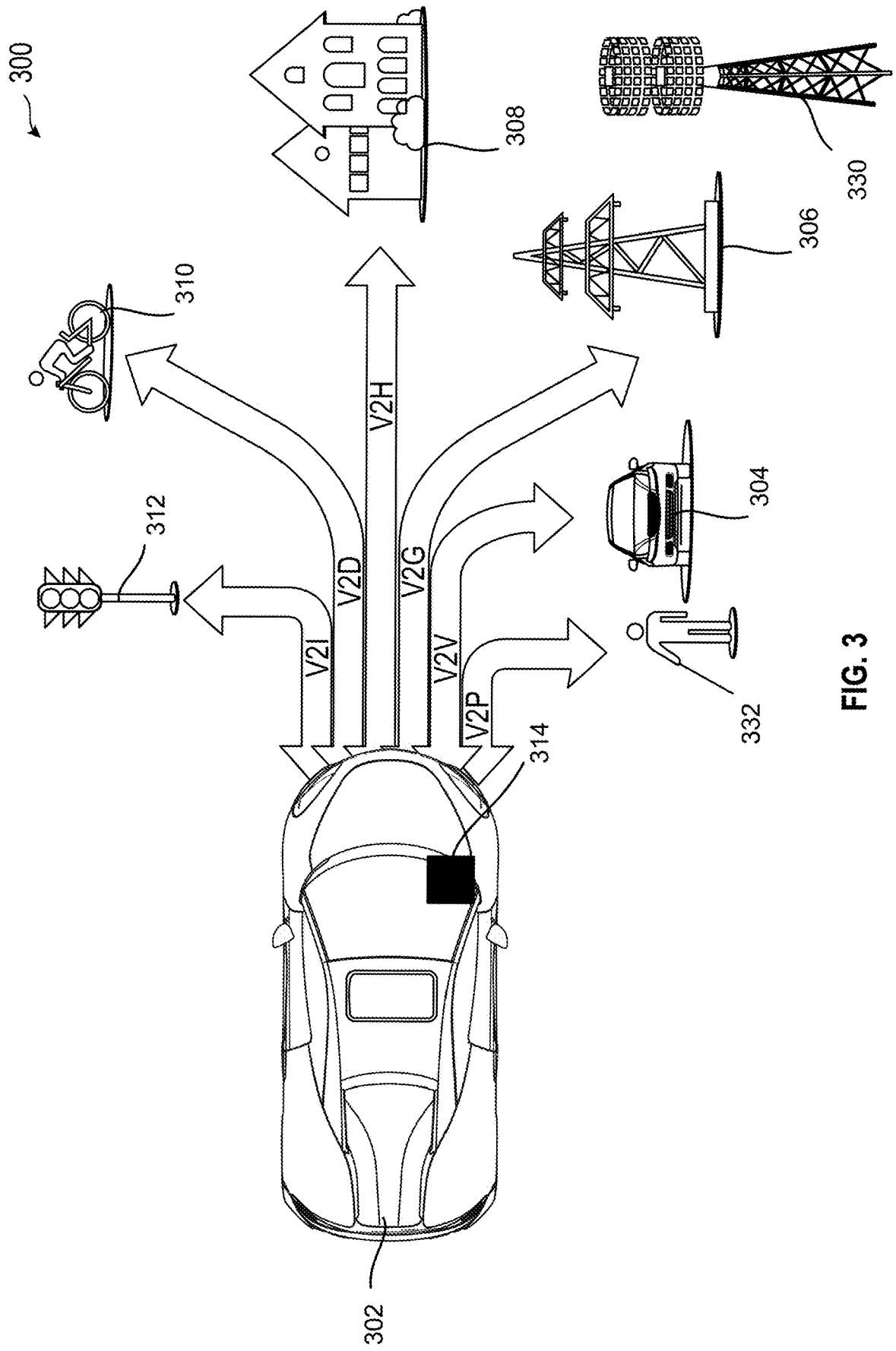
FIG. 3 illustrates a vehicle having communication capabilities, according to example embodiments of the present inventions.

FIG. 3 illustrates a system 300 including a vehicle 302 having in-vehicle communication systems for a variety of communication types. Within the vehicle 302 is a NR infrastructure element 314. The system 300 includes is a configuration of communication elements. The vehicle 302 has potential for communication with gNode B 330 while in motion, where the in-vehicle system element 314 is a reflectarray (RA) with capability to amplify and/or redirect received signals. The vehicle 302 may also include a variety of other capabilities, as illustrated, which may also benefit from the inventions detailed herein.

As communication capabilities expand, such as more and more devices on the Internet of Things (IoT), there will be vehicle-to-device (V2X) systems. As illustrated, the vehicle 302 communicates vehicle-to-infrastructure (V2I) with traffic element, smart infrastructure 312, where communications may be done by way of a communication module within vehicle 302 and may bounce signals off the element 314. This may provide alerts to drivers, traffic light information, traffic congestion or roadblock information, road conditions and so forth. The element 314 enables the vehicle to communicate with smart infrastructure 312. Similarly, the vehicle 302 communicates with devices, V2D, such as cyclist 310, which may have a GPS module or a cell phone or IoT or other communication device that interfaces directly and/or through element 314. The V2D allows the car to communicate with cycles and other V2D devices.

Another communication that is enabled by the element 314 is between the vehicle and home (V2H) or vehicle and office (V2O), which is through gNode B 330 or other NR infrastructure element, the range of which is expanded by element 314. The vehicle may receive signals from non-Line of Sight (NLOS) devices via element 314. The vehicle may communicate with the power network 306 that is part of an electric grid (V2G), which may be used for electric vehicles.

For advanced driver assist systems (ADAS) and autonomous drive vehicles it is beneficial to communicate with other vehicles (V2V) to identify the presence of other vehicles and communicate. Additionally, communication with pedestrians (V2P), such as person 332, and so forth provides real time information that may be used when vehicle 302 is in motion. In all these examples, the ability to reflect a signal into a vehicle and out of a vehicle extends the capabilities of a vehicle into the developing smart connected environments.

Figure 4:
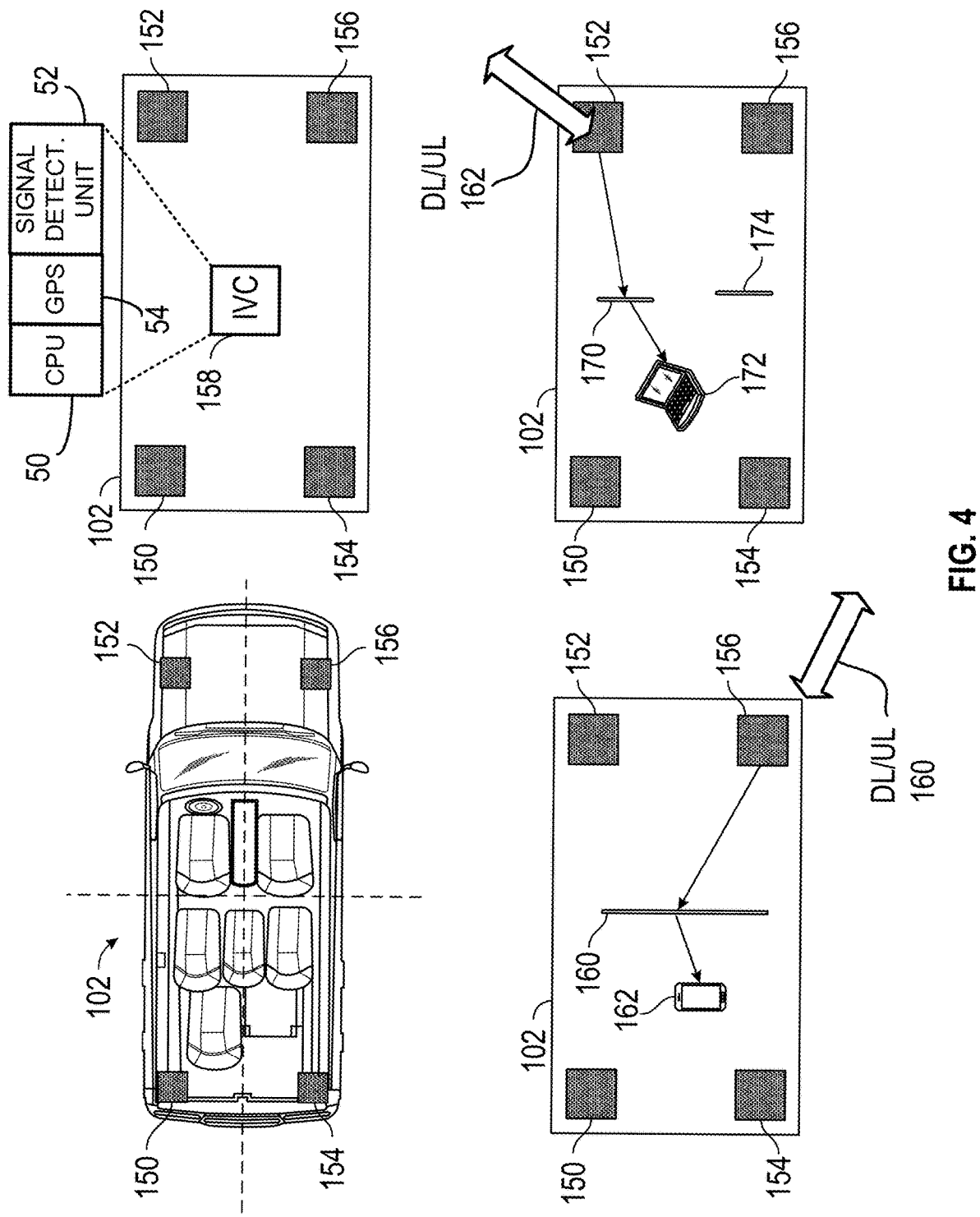
FIG. 4 illustrates an in-vehicle communication system, according to example embodiments of the present inventions.

FIG. 4 illustrates the vehicle 102 having edge reflectarray devices or repeaters positioned as illustrated. The edge extension devices 150, 152, 154, 156 are positioned so as to provide coverage in various directions from the vehicle 102. An In-vehicle control (IVC) unit includes a central processing unit (CPU) 50, a global positioning system (GPS) 54 and a signal detection unit 52. The signal detection unit 52 determines if a wireless signal is below a threshold, and in response the CPU initiates control and activation of the of one or more edge reflectarrays or repeater devices. In the present embodiment, each of the edge reflectarray devices covers a sector of the coverage area, which in the illustrated example is a quadrant. The edge extension devices 150, 152, 154, 156 are each a reflectarray having capability to amplify a received signal and redirect same signal within the vehicle 102; these edge reflectarray devices form an in-vehicle communication system. The vehicle 102 further includes a sensor module 60, which may be a radar, lidar, or other apparatus to detect AoA of signals and range to objects, and a communication module 62, which processes communication signals, such as from a wireless system. The communication module 62 detects a signal strength of received signals to identify those signals below a threshold level. The communication module 62 may be part of the IVC 158, the sensor module 60, a wireless extension device adapted to extend the coverage area to receive wireless signals or may be a separate module as illustrated in FIG. 4. As described herein, a wireless extension module, apparatus, device and so forth may be a device to redirect signal, such as a passive or active reflectarray, or a device to improve the quality of the received signals, such as a relay, repeater or other amplification device. There are a variety of apparatuses that may be designed to achieve the goals of providing quality service to UE(s) within a vehicle and overcome the obstructions and interference that the vehicle itself may introduce into a wireless transmission and connection to UE(s). These wireless extension devices may also overcome obstructions and interference from within the external environment.

FIG. 4 illustrates the vehicle 102, as in FIG. 1, having edge reflectarray devices positioned as illustrated. The edge extension devices 150, 152, 154, 156 are positioned so as to provide coverage and various benefits from the inventions detailed herein. As illustrated, the edge extension devices 150, 152, 154, 156 are positioned at the corners of the vehicle 102. Within the vehicle 102, internal reflectarray 160 is positioned within the vehicle 102, such as placed inside on the roof, to receive signals from the edge extension devices 150, 152, 154, 156 and redirect signals within the vehicle. The internal reflectarray 160 may be a passive reflectarray positioned to achieve one or more redirections of signals from the edge extension devices 150, 152, 154, 156. As illustrated, a signal received at edge reflectarray device 156 is then directed to the internal reflectarray 160, which then redirects the signal to a UE 162 within the vehicle. The communications are via DL/UL 160. The reflectarray devices may be positioned at other places of the vehicle and may include any number of reflectors. In some embodiments, the reflectarray is a part of the frame of the vehicle as in FIG. 12, where the reflectarray 1002 is located within front dashboard as shown. Other examples position reflectarrays in other positions around the vehicle such as side doors and so forth.

Similarly, in another example, the internal reflectarrays 170, 174, are positioned within the headrests of seats in the vehicle results in redirection of received signals to other areas of the vehicle. Signals received at edge reflectarray device 152 are directed to the internal reflectarray 170 which redirects the signals to a laptop 172 within the vehicle. There may be any number of internal reflectarrays in a variety of positions. The structure of these internal reflectarrays, such as 160, 170, 174, are configured with multiple reflective elements sized and positioned to enable reflections as desired. The edge devices may be repeaters that amplify the signal to improve signal gain in the vehicle. There may be a variety of configurations of reflectarrays and repeaters around the vehicle.

Figure 5:
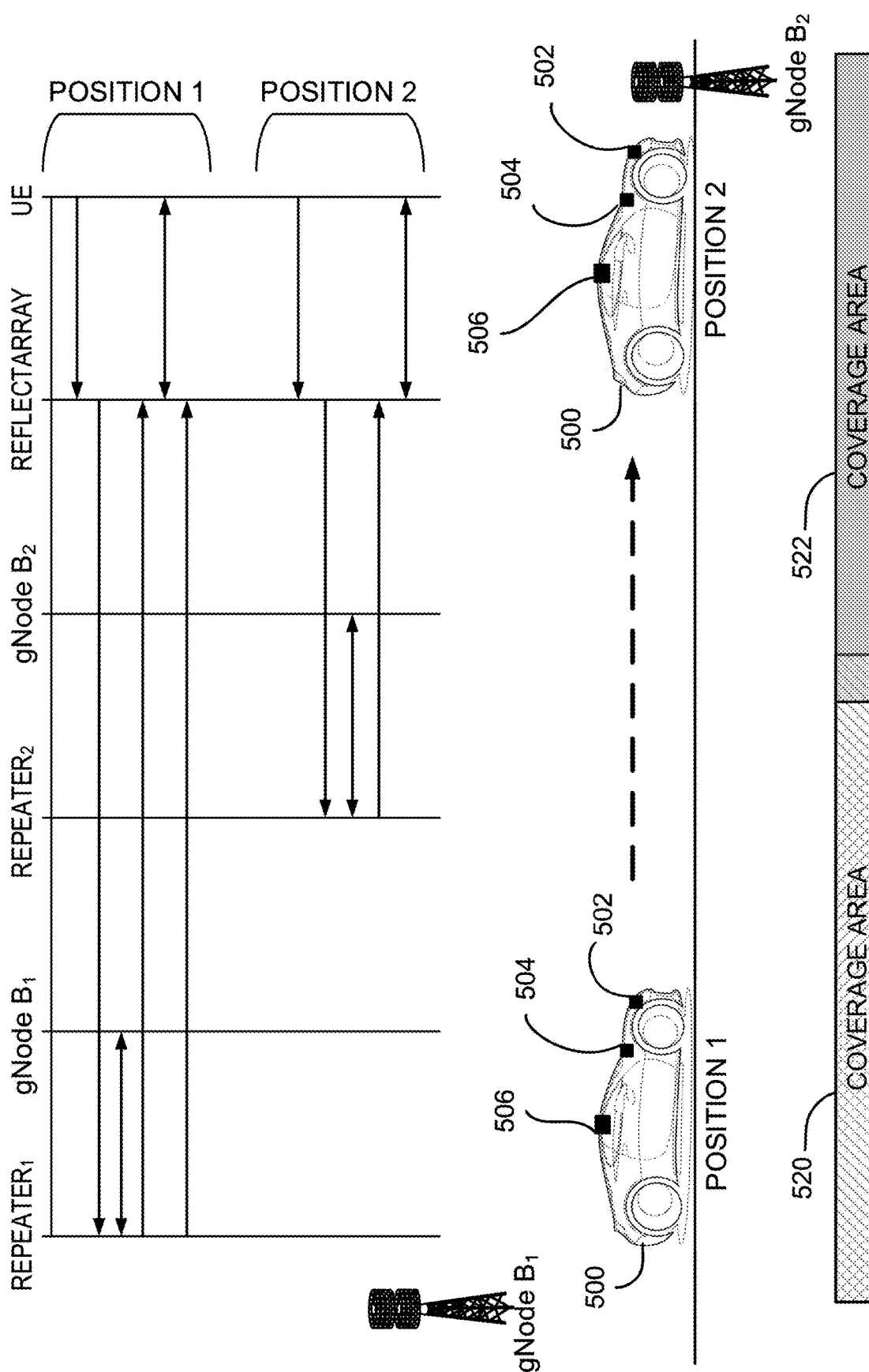
FIG. 5 illustrates a signal flow diagram of an in-vehicle communication system transmissions, according to example embodiments of the present invention.

FIG. 5 illustrates signal flows during communications between communication networks and vehicle infrastructure device(s). The scenarios described are illustrated below the signal flow diagram. A vehicle 500 includes a repeater 502, referred to as $REPEATER_1$, A repeater 504, referred to as $REPEATER_2$, an internal vehicle reflectarray 504, referred to as REFLECTARRAY, and a UE (not shown) located therein. The vehicle 500 is moving in an environment having multiple NR gNode B infrastructures, including gNode $B_1$ 510 and gNode $B_2$ 512. These may be any of a variety of type infrastructures and are illustrated here for clarity of understanding as each of gNode $B_1$ 510 and gNode $B_2$ 512 as these use directed transmissions and have range sufficient to communicate with UEs within that range. In this example, the vehicle 500 moves from the range of gNode $B_1$ 510 to the range of gNode $B_2$ 512. While at position 1, the UE or other wireless device within vehicle 500, detects coverage area 520 coverage through reflector 506 (REFLECTARRAY), REPEATER 508 ($REPEATER_1$). The communication signals between gNode $B_1$ and UE 500 are redirected and amplified by REFLECTARRAY AND $REPEATER_1$. As the vehicle 500 moves forward, it moves out of coverage area 502 and into the coverage area 522 associated with gNode $B_2$. The UE detects gNode $B_2$ and communicates through repeater 504 ($REPEATER_2$) and reflector 506. In this way, the vehicle has several channels or paths for UE communications using the in-vehicle communication system.

Figure 6:
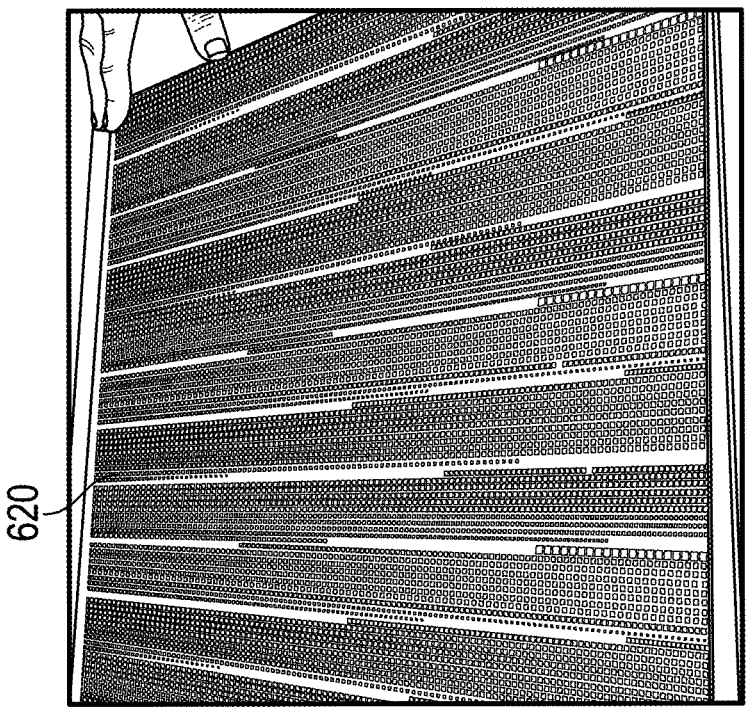
FIG. 6 illustrates in-vehicle internal reflectarrays, according to example embodiments of the present invention.
Figure 6:
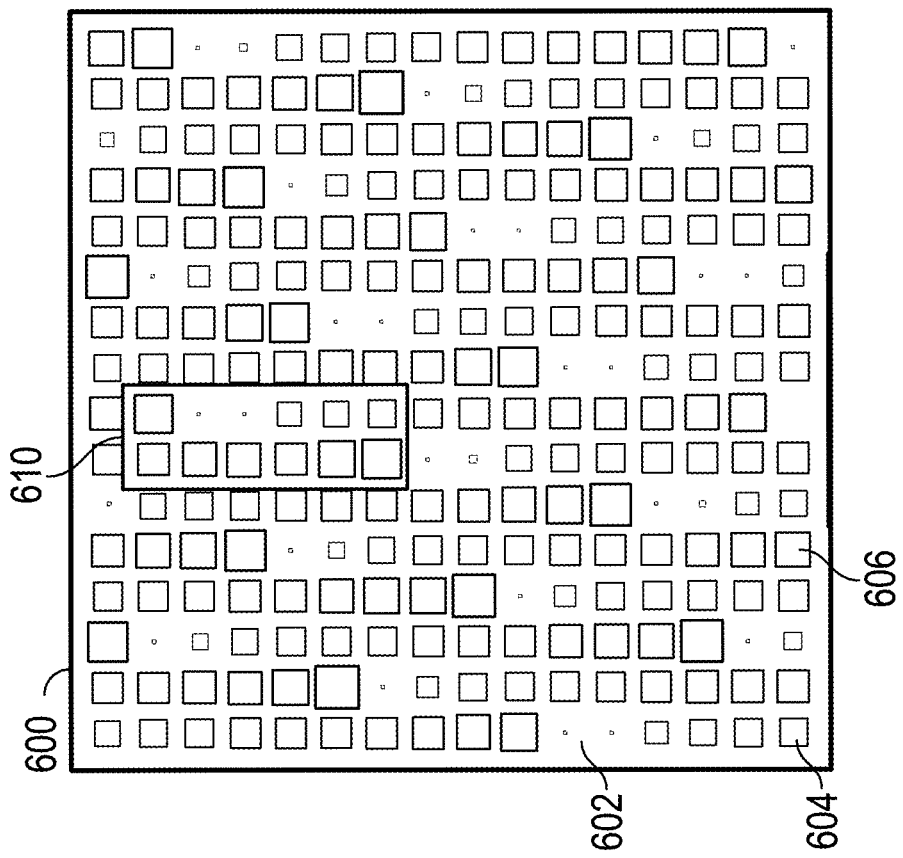

FIG. 6 illustrates an example of a reflectarray 600 having a plurality of reflective elements, such as element 604 and element 606 as well as spaces 602. The shape, size, configuration, and placement of elements within internal reflectarray 600 are designed to achieve a specific redirection of signals within the known geometry of the vehicle. The internal reflectarray 600 is a passive device that may be independently positioned within the vehicle as a function of the relation to the edge reflectarray devices and the target coverage area, such as to a back seat of a vehicle. The internal reflectarray 600 may be designed to have redirection, or reflection, capabilities with respect to one or more edge reflectarray devices, such that signals received at any of the devices will be redirected to the same location within the vehicle. In some embodiments, multiple internal reflectarrays are positioned to accommodate the various edge reflectarray devices. The internal reflectarray 600 may have subarrays therein to achieve multiple reflections and/or to respond to different frequency or amplitude signals. In the present embodiment the internal reflectarray 600 is a passive device, having no active components. Alternate embodiments may employ different schemes. An example illustrated in FIG. 12 has a vehicle 1000 communicating using a reflectarray 1002 positioned in the dashboard portion of the vehicle 1000.

Figure 7:
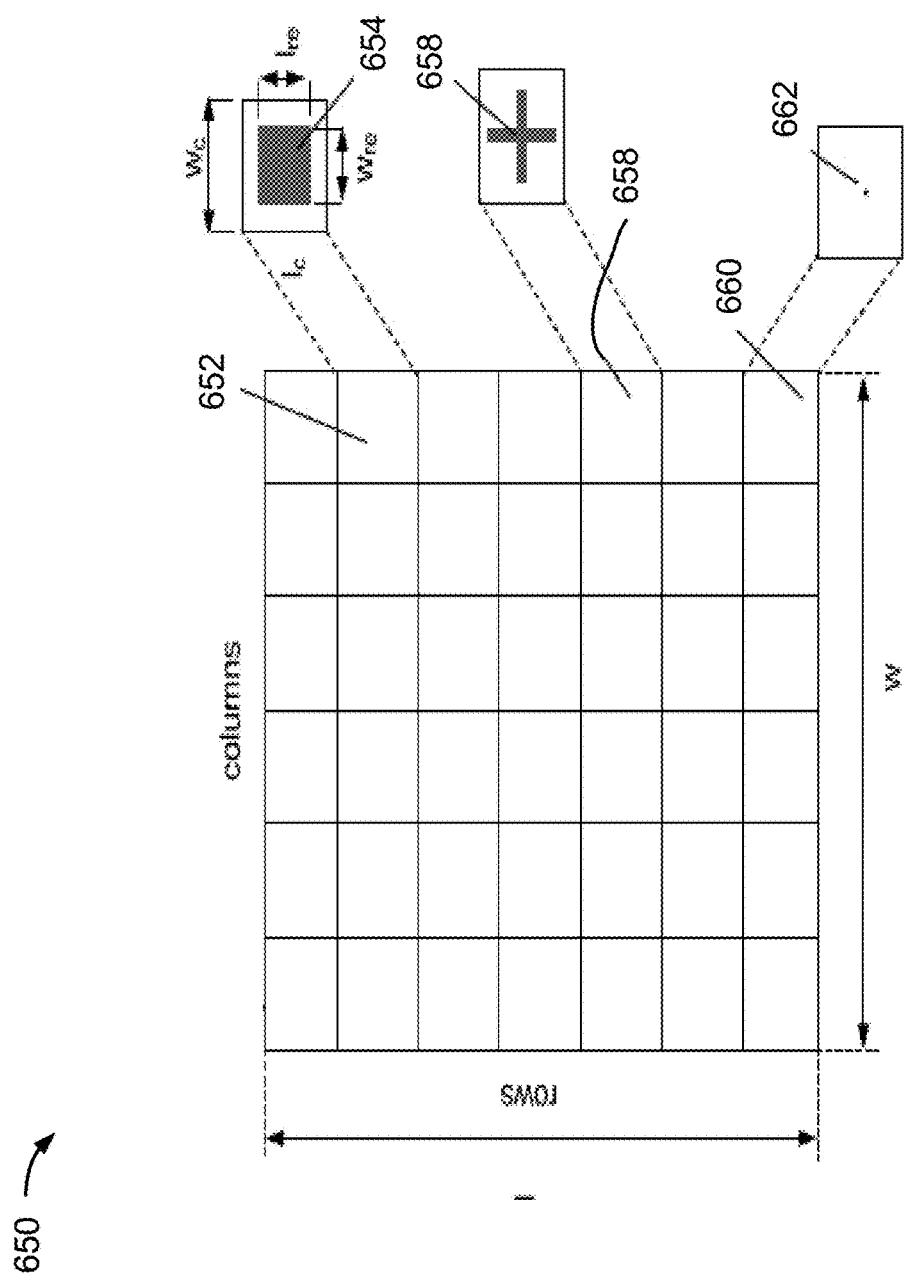
FIG. 7 illustrates a reflectarray configuration, according to example embodiments.

FIG. 7 illustrates a reflect array device 650 in a schematic diagram of a meta-structure (MTS) reflectarray and its cell configuration in accordance with various examples. An MTS device or array may be composed of metamaterial cells or other structures that behave in a manner similar to metamaterials, wherein the design and configuration of a conducting medium behaves in a manner not expected from a circuit perspective. A meta-structure, as generally described herein, is an engineered structure with electromagnetic properties not found in nature. In various examples, an MTS has an array of non- or semi-periodic structures that are spatially distributed to provide a specific phase and frequency distribution and capable of controlling and manipulating electromagnetic (EM) radiation at a desired direction. The MTS array is fed and controlled so as to switch its transmission beams to one of multiple positions. There may be any number of configurations to achieve a desired result, wherein an MTS array may be frequency selective, responding only to specific frequencies, or may include subarrays or elements having frequency selectivity properties when incident electromagnetic waves are of different frequencies. For example, an MTS array may have a first element or subarray that responds to a first frequency and a second element or subarray that responds to a second frequency. The first element or subarray may be nonresponsive to the second frequency or may have a different response to each frequency. In this way an MTS reflectarray may be designed to respond to multiple frequencies.

In some embodiments, a first element or subarray responds to signals received from a first angle of incidence or angle of arrival so as to redirect the signal in a first direction, and responds to signals received from a second angle of incidence or angle of arrival so as to redirect the signal in a second direction. The second element or subarray has a similar behavior corresponding to different angles of incidence or angle of arrival.

Some examples or embodiments may incorporate an in-vehicle control (IVC) unit adapted to receive signals from the relay arrays, reflectarrays or other wireless extension devices to detect signal quality or strength and initiate processing. The processing may be to apply a gain or amplify the signal within the vehicle. The IVC unit may include a signal detection module, an angle of arrival (AoA) detection mechanism, a processing unit or other modules to control the signal within the vehicle. In some embodiments, a radar module is provided to enable AoA and range detection of a cellular infrastructure element, such as a BS or gNode B. This information is provided to the IVC to enable control decisions.

In some embodiments, the first element or subarray may respond to signals having a first gain or amplitude with a first behavior, such as a first redirection angle for a passive device, and may apply a gain to the signal in an active device. The examples presented herein may incorporate a signal detection apparatus and/or method to detect when such gain is to be applied.

Reflectarray 650 is an array of cells organized in rows and columns. The reflectarray 650 may be passive or active. A passive reflectarray does not require electronics or other controls, as once in position it directs incident beams into a specific direction or directions. To change the direction(s) may require repositioning the entire reflectarray, which can be achieved by means of mechanical or electronically controlled rotating mounts on the back of the reflectarray 650. The reflectarray 650 provides directivity and high bandwidth and gain due to the size and configuration of its individual cells and the individual reflector elements within those cells.

In various examples, the cells in the reflectarray 650 are MTS cells with MTS reflector elements. In other examples, the reflectarray cells may be composed of microstrips, gaps, patches, and so forth. Various configurations, shapes, and dimensions may be used to implement specific designs and meet specific constraints. As illustrated, reflectarray 650 may be a rectangular reflectarray with a length/and a width w. Other shapes (e.g., trapezoid, hexagon, etc.) may also be designed to satisfy design criteria for a given 5G application, such as the location of the reflectarray relative to a wireless radio, the desired gain and directivity performance, and so on. Each cell in the reflectarray 650 has a reflector element. The reflector elements may also have different configurations, such as a square reflector element, a rectangular reflector element, a dipole reflector element, a miniature reflector element, and so on. The configuration and element shape, size and combination may be determined by the structure of a vehicle, so as to position the reflectarray in potential locations that enable extension of wireless signals to reach within the vehicle.

For example, cell 642 is a rectangular cell of dimensions $w_c$ and $l_c$ for its width and length, respectively. Within cell 642 is an MTS reflector element 644 of dimensions $w_{re}$ and $l_{re}$. As an MTS reflector element, its dimensions are in the sub-wavelength range (~λ/3), with λ indicating the wavelength of its incident or reflected RF signals. In other examples, cell 606 has a dipole element 658 and cell 660 has a miniature reflector element 662, which is effectively a very small dot in an etched or pattern printed circuit board (PCB) metal layer that may be imperceptible to the human eye. As described in more detail below, the design of the reflectarray 650 is driven by geometrical and link budget considerations for a given application or deployment, whether indoors or outdoors. The dimensions, shape, and cell configuration of the reflectarray 650 will therefore depend on the application. Each cell in the reflectarray 650 may have a different reflector element.

Figure 8:
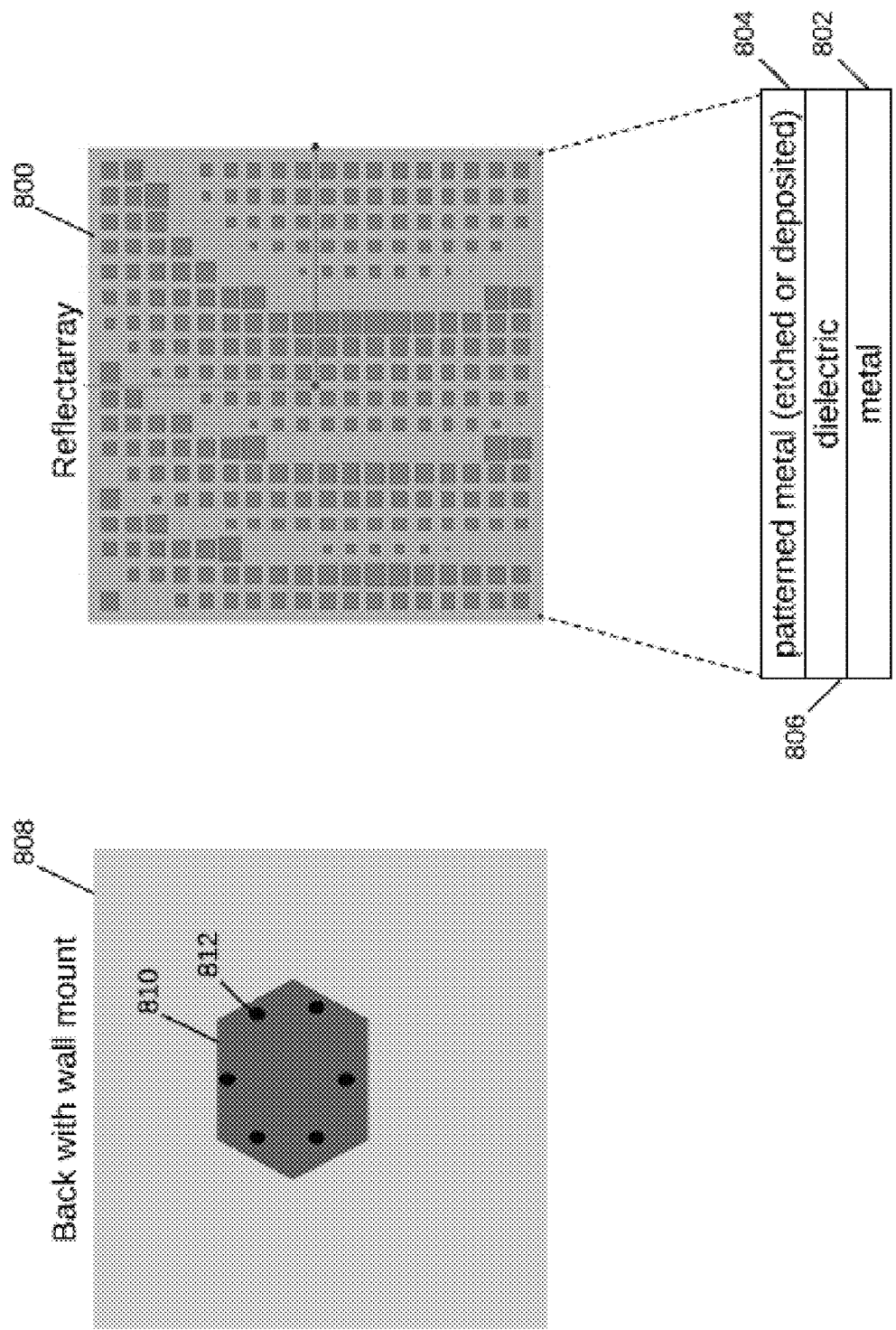
FIG. 8 illustrates a reflectarray system, according to example embodiments of the present invention.

FIG. 8 illustrates a reflectarray with a surface mount in its back surface in accordance with various examples. Reflectarray 800 has high manufacturability as it can be made of low-cost PCB materials suitable for high frequency operation. As illustrated, reflectarray 800 has a metal ground plane 802 and a patterned metal layer 804 surrounding a dielectric material 806. The reflector elements of the reflectarray 800 can be etched or deposited into a metal material to form the patterned metal layer 804. In various examples, the metal ground plane 802 and the patterned metal layer 804 are copper layers surrounding a composite dielectric material. Other materials may be used to design the reflectarray 800, depending on the desired performance of a given 5G application. A back surface 808 can be attached to the ground plane layer 802 of reflectarray 800 to provide a mount 810 for a surface.

Figure 9:
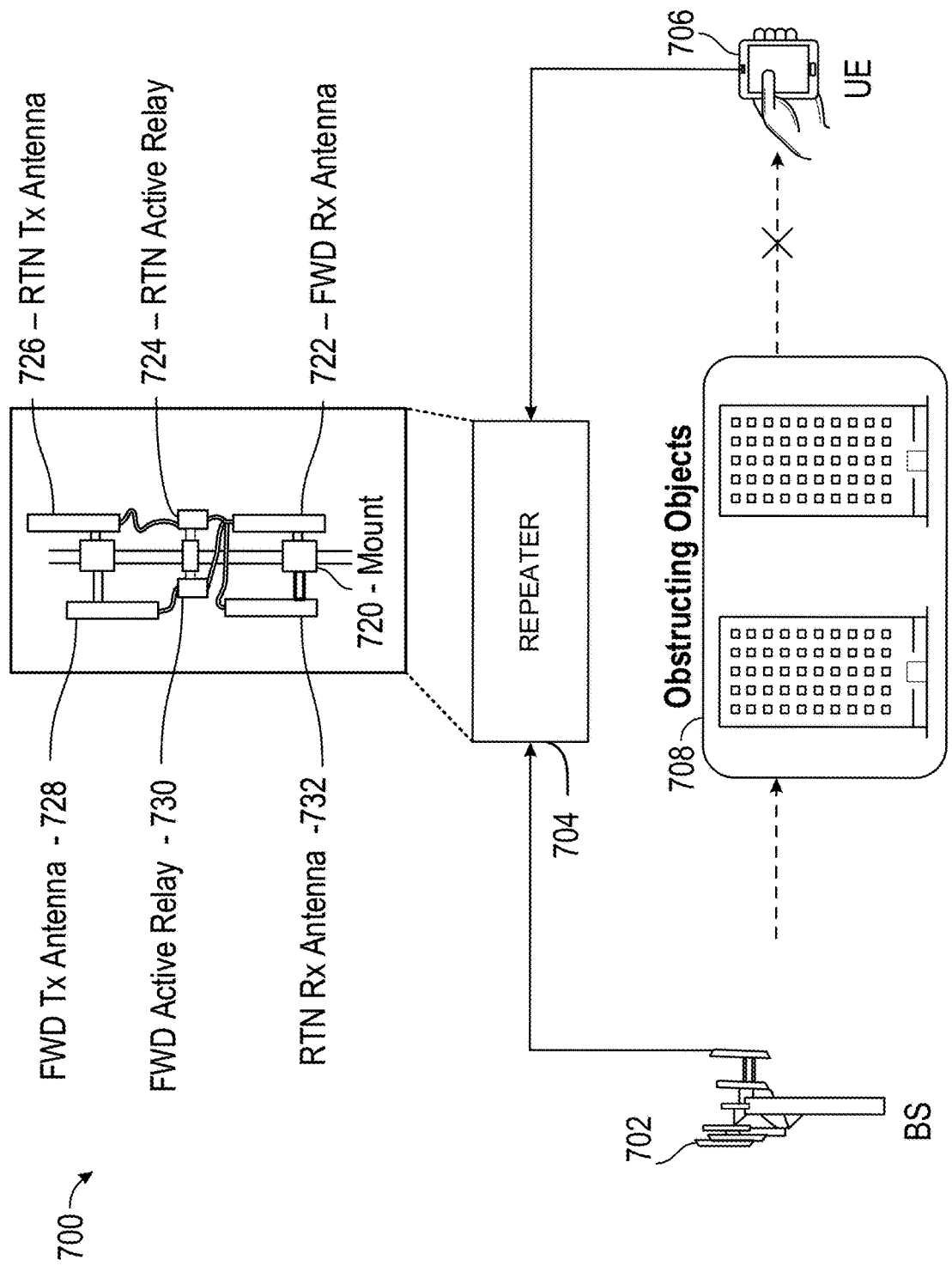
FIG. 9 illustrates a repeater, according to example embodiments of the present invention.

FIG. 9 illustrates an edge reflectarray device, according to some embodiments, for communications with BS 702, such as a 4G or 5G transmitter. The device 704 is a high gain active relay antenna system adapted to receive, amplify, and redirect signals, such as to UE 706. This may be to avoid obstructing objects 708 or may be to provide the signals within a vehicle. The device 704 includes active relays coupled between antennas as illustrated and is considered a repeater as it receives a signal from BS 702 and processes the signal to increase the gain for further transmission. The active relay 704 acts to magnify the received signal. In some embodiments, the active relay antenna system 704 incorporates phase control of antennas to enable beam steering and flexible redirection of signals.

In this example active relay circuit implementation illustrated in FIG. 9, active relay circuit 700 is designed with integrated low noise amplifiers (LNA) and variable gain amplifiers (VGA). These amplifiers, in addition to other devices, LNAs and PAs, may be integrated into a single millimeter wave integrated circuit (MMIC) for market scalability.

The details of system 704 include transmit antennas 722, 728, and receive antennas 726, 732, configured as illustrated. Similarly, the forward active relay 730 and return active relay 724 are positioned there between.

In some embodiments, the repeater 700 is a high gain active relay antenna system configured and adapted to perform for millimeter wave, or mm-wave, applications and may be deployed in a variety of different environments and may be implemented in a variety of configurations to achieve these goals. Mm-wave applications are those operating with frequency allocations between 24 GHz and 300 GHz or a portion thereof, including 5G applications such as for frequencies including 24, 26, 28, 39, and 60 GHz. The new communication systems are moving away from omnidirectional transmissions where energy is provided in large areas to an individually directional system where beams are directed to specific users and devices. The directed beams are high frequency narrow beams that are a reduced range but are able to provide increased data rates. In such a system, there is a need to extend the beams to reach users beyond that range and in non-line of sight (NLOS) areas. These extension methods include reflectors to redirect beams and repeaters/relays to amplify gain. The communication systems of directed beams are more complicated than those of prior omnidirectional transmissions. In various examples, a high gain active relay antenna system provides a high gain amplification of wireless signal to connect with wireless devices and UE that are operational in complicated environments as more and more infrastructure elements are implemented. For outdoor environments there are obstructing structures, such as skyscrapers, buildings, trees, tunnels, traffic signage and so forth. There are also outdoor NLOS areas that interfere with the directed beams. Indoor environments also have obstructions, such as walls, doors, corridors and so forth. The high gain active relay antenna system has an active amplification subsystem that is made of amplifiers in several stages, which may include low noise amplifier (LNA) stages, gain-control attenuators (GCA), variable gain amplifier (VGA) stages, and power amplifier (PA) stages.

Optional functionalities, such as filtering, phase shifting, beam-steering, beamforming (e.g., performed by beamforming networks), and matching (e.g., performed by matching networks (MNs), which may employ step-adjustable attenuators) may also be implemented. In particular, for relay solutions involving higher layers, such as the Media Access Control (MAC) layer, network layer processing, analog-to-digital conversion, digital-to-analog conversion, digital channelization filtering, and other physical layer functionalities may also be implemented. Frequency conversion operations in both up-conversion and down-conversion may also be implemented in the high gain active relay antenna system. The main applications supported by the disclosed high gain active relay antenna system include general wireless cellular communication network optimization in various scenarios (e.g., planned or temporary), which may include, for example, range extension of relay links, availability enhancements of radio links in extreme conditions, and all possible solutions for mission critical applications.

The high gain active relay antenna system described hereinbelow provides a way for a network operator to provide ubiquitous coverage, and vastly improve coverage, at a low cost. The disclosed system can provide a basis for efficient network planning and optimization solutions in the context of network densification, which is one of the major 5G NR features.

Continuing with FIG. 9, a schematic diagram provides an illustration of a repeater or high gain active relay antenna system in an example environment 700 and configuration therein. The repeater 704 is a robust and low-cost relay solution that is positioned as illustrated between a base station (BS) 702 and UE 706 to optimize network coverage. repeater 704 (with may be referred to herein as a relay) may be a fixed or mobile relay positioned in different elements (e.g., buildings, vehicles, lifters, airliners, etc.) across a network environment (e.g., remote areas, underground, offshore, on the sea, etc.). In various examples, repeater 704 may be used for wireless communications between the BS 702 to the UE 706, and may work in collaboration with other infrastructure elements to extend transmission beams, such as a reflectarray. the UE 706 to the BS 702. In either scenario, high gain active relay antenna system 100 provides a high gain to compensate for any propagation loss that occurs within the environment, which can be as high as 110 to 130 decibels (dB) in a 28 GHz 5G network, over a distance of about 150 to 300 meters (m), in a line-of-sight (LOS) area or in a nonline-of-sight (NLOS) area. The link from the BS 702 to the UE 706 is referred to herein as the forward link (FWD link), downlink, or DL, and involves a backhaul section from the BS 702 to the relay 704, and an access section from the repeater 704 to the UE 706. The link from the UE 706 to the BS 702 is referred to herein as the return link (RTN link), uplink or UL, and involves an access section from the UE 706 to the repeater 704, and a backhaul section from the repeater 704 to the BS 702. Using a different terminology, the radio links between the BS 702 and the repeater 704, Relay Node or RN, of the return link or forward link, are referred to as donor links, and the radio links between the repeater 704 and the UE 706, of the return link or forward link, are referred to as the service links. Note that because the backhaul link (of the backhaul section) between the repeater 704 and the BS 702 is a point-to-point link, the repeater 704 may be implemented with high gain array antennas for a long distance. Service links are usually point-to-multiple points in a forward direction, and multiple points-to-point in a return direction and, consequently, wide-beam antennas are usually used, and the distance is shorter.

As shown with the dotted arrows, the path between the BS 702 and the UE 704 is blocked by obstructing objects 708, which may include an infrastructure(s) (e.g., high rise buildings), vegetation, and so on. Where the UE 706 and the repeater 704 are located in a mobile vehicle, movement changes the physical relation of the repeater 704 with BS 702. In a vehicle, the repeaters, such as repeater 704, are positioned to achieve a variety of physical configurations and enable continued communication during movement. The BS 702 is then able to provide wireless coverage to the UE 706 at a high gain and, therefore, achieve the desired performance and wireless experience for the ULE while in an extended range of BS 702.

In these and other examples, a repeater 704 includes two pairs of antennas, which include one antenna pair for the FWD link and another antenna pair for the RTN link. The FWD link antenna pair includes a FWD receive antenna 722 to receive signals transmitted from a transmitter, such as BS 702, and a FWD transmit antenna 728 to relay, (transmit) the signals to the UE 706 after power amplification of the signals by a FWD link active relay 730 of the repeater 704. The RTN link antenna pair includes a RTN receive antenna 732 to receive signals transmitted from the UE 706, and a RTN transmit antenna 726 to relay (transmit) the signals to the BS 702 after power amplification of the signals by a RTN link active 724 of the repeater 704. The antennas transmitting and receiving signals between the repeater 704 and the UE 706, the FWD transmit antenna 728 and the RTN receive antenna 732 are referred to as access link antennas. And, the antennas transmitting and receiving signals between the repeater 704 and the BS 702, the FWD receive antenna 108 and the RTN transmit antenna 114, are referred to as backhaul link antennas.

An active relay is located between each pair of relay antennas, FWD active relay 730, is located between the FWD receive antenna 722 and the FWD transmit antenna 728, and a RTN active relay 724 is located between the RTN receive antenna 732 and the RTN transmit antenna 726. The active relays, FWD active relay 730 and RTN active relay 724, are designed to provide a high power gain, which boosts a weak signal plagued by propagation loss from the receive antenna, FWD receive antenna 722 and RTN receive antenna 732, to a specific gain level to drive the transmit antenna, FWD transmit antenna 728 and RTN transmit antenna 726. The repeater 704 also includes support mounts, such as mount 720, to serve as support members for the antennas and the active relays of the relay 100. In should be noted that, in one or more examples, the repeater 704 may comprise more than two pairs of antennas as is shown in FIG. 1.

It is appreciated that the proposed architecture of the repeater 704 with two antenna pairs and one active relay between the receive and transmit antennas of each antenna pair is particularly suitable for millimeter wave relay applications, where the backhaul link is typically a point-to-point link and the access link is a point-to-multipoint link. Further, the architecture of the repeater 704 allows for a separation between the access link antennas, specifically the FWD transmit antenna 728 and the RTN receive antenna 732, and the backhaul link antennas, specifically the FWD receive antenna 722 and the RTN transmit antenna 726, so that they may be optimized in an independent way without any constraint from each other. In this way, the access link antennas may be designed for a wide and/or shaped coverage area to provide optimized connectivity with devices, while the backhaul link antennas can be implemented with high directivity designs with narrow beams to compensate for the high path loss in the millimeter wave band), thereby alleviating the interference caused by other cells within the network. The backhaul link antennas can be optimally pointed to the BS(s), and the access link antennas can be pointed to the coverage area of the UE(s) at the best orientation angle.

Note that for an access link antenna, its gain is reduced when it is designed to cover a wide area with a wide beam. In such circumstances, the coverage area will not be large with the limited beamforming gain for these types of access link antennas. The access link antennas can be designed to form shaped beams, such as beams with specific shapes to cover an area in which most of the subareas are covered and some of the areas can be masked without signals reached. This is a feature of the disclosed two-antenna architecture for the relay 100. Also note that an active solution becomes necessary, and even indispensable, in millimeter wave wireless applications. The power amplification functionality provided by the active relays, such as FWD active relay 730 and RTN active relay 724, enables a power gain from some tens of dB up to over hundreds of dB to boost the relayed signal in both the downlink and uplink signals, thereby meeting the connectivity requirements in the access links.

Figure 10:
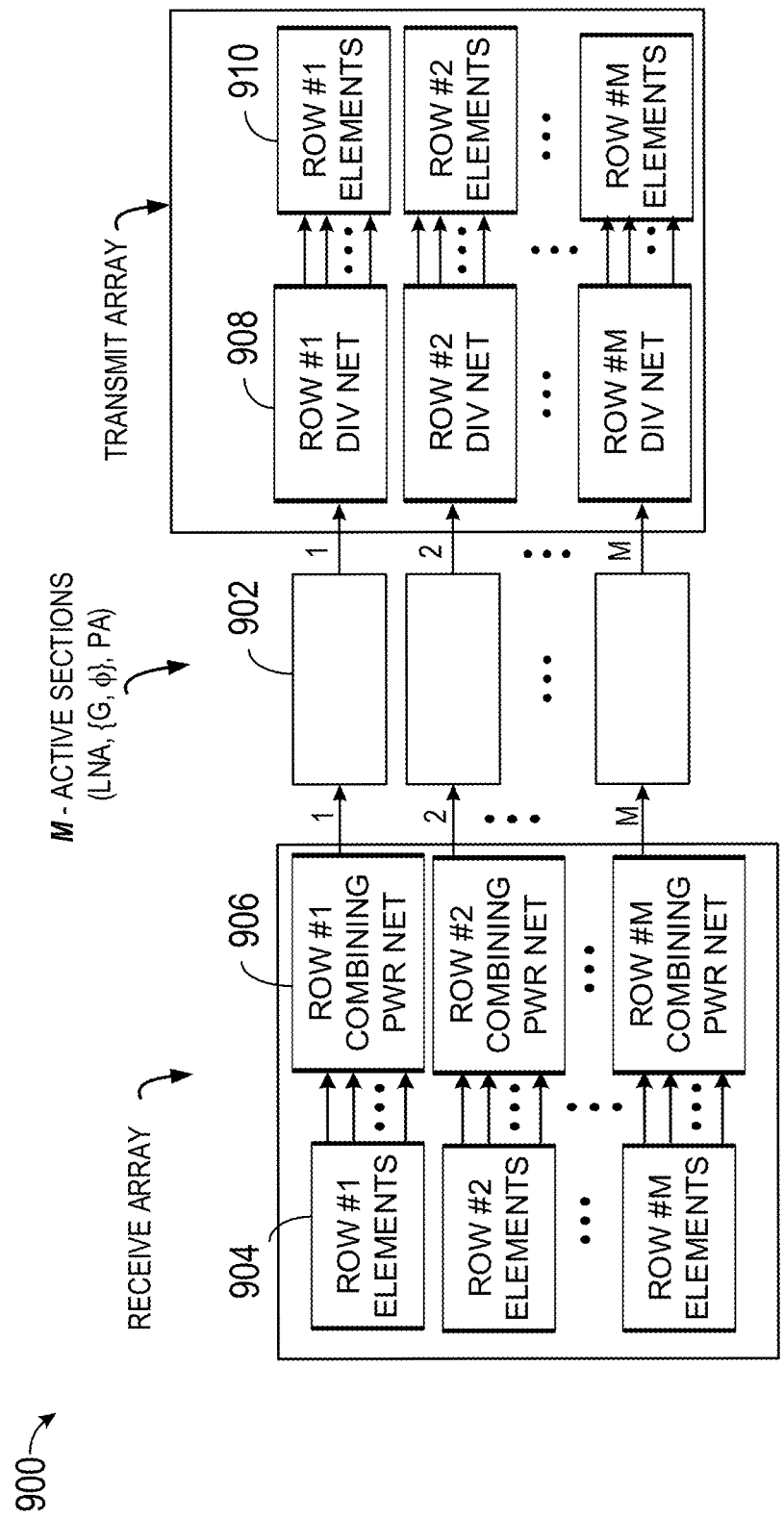
FIG. 10 illustrates a reflectarray device, according to example embodiments of the present invention.

FIG. 10 illustrates a vehicle device according to other embodiments. Note that the vehicle devices may have active relay architectures that may be applied in various use cases with system level solutions. Examples include partial power combining and dividing in beamforming and steering, active relay solutions based on subarray configurations, active power bootstrapping with separate RA antennas, active relay solutions for frequency division duplexing (FDD) and time division duplexing (TDD) operations, and many others. As illustrated in FIG. 10, active relays are used to realize better design trade-offs in partial power dividing and partial power combining networks. In architecture 900, multiple active relay sections 902 are implemented to drive transmission signals from phase array receive antennas 904 and partial power combining network 906 to partial power dividing network 908 and ultimately phase array transmit antennas 910.

For high gain phased arrays, the number of elements can be very large. A one-element-one-PA configuration could be very difficult to implement, and in addition, DC power consumption could be prohibitive. In case where the phases at all the elements are aligned, the signals received at various elements can be combined with power combiners. Once amplified by the PAs at the active relay sections 902, these amplified signals can be all combined, divided, and redistributed for transmission. The active relay architecture 900 is scalable and adaptable to both variable and fixed scenarios for the phase alignments between the two independent receive and transmit phase arrays. Almost any 5G relay scenario can be supported with this universal architecture configuration for highly flexible and active relay solutions with trade-offs done between antenna cost and coverage performance.

An example solution is illustrated in FIG. 10, where a partial power dividing network 908 and a partial power combining network 906 are employed to realize better design trade-offs. In particular, the active relay architecture 900 employs an L×M receive array, phased array receive antenna 904, and an L×M transmit array, phased array transmit antenna 910, wherein L is the number of the array elements in each row, and M is the number of the columns. This active relay architecture 900 provides beamforming in one of the dimensions, azimuth or elevation, where, for example, a number of M beams are formed in azimuth and beam-steering can be performed for each beam such that the beam-steering is controlled by the active relay sections 902. In one or more embodiments, the active relay sections 902 align a plurality of phases at the plurality of receive antenna elements of the phased array receive antenna 904 with a plurality of phases at the plurality of transmit antenna elements of the phased array transmit antenna 910. These active relay sections 902 are implemented in the active relay architecture 900 to drive the transmission signals from the phased array receive antenna 904 to the partial power combining network 906, to the partial power dividing network 908, and ultimately to the phased array transmit antenna 910. The receive section, comprising the phased array receive antenna 904 and the partial power combining network 906, and the transmit section, comprising the partial power dividing network 908 and the phased array transmit antenna 910) of the active relay architecture 900 are independently designed according to the receive angle space specification and the transmit angle space specification, respectively, which are not necessarily identical.

Another example supported by the active relay architecture 900 is for high gain applications using phased arrays, where the number of elements can be very large. For these applications, a one-element-one-PA configuration could be very difficult to implement and, in addition, the DC power consumption could be prohibitive. In cases where the phases at all of the elements are aligned, the signals received at various elements can be combined with power combiners. Once the signals are amplified by the PAs by the active relay sections 902, these amplified signals can be combined, divided, and redistributed for transmission. The active relay architecture 900 is scalable and adaptable to both variable and fixed scenarios for the phase alignments between the two independent receive and transmit phased arrays. A feature of the active relay architecture 900 is that it supports from one beam up to M number of beams, and the transmit beamforming operations are realized in space. Almost any 5G relay scenario can be supported with this universal architecture configuration for highly flexible and active relay solutions with trade-offs performed between antenna cost and coverage performance. In the architecture 900, the phases are aligned across rows. There are M active sections with independent gain control to steer the beam in a column sense, either horizontal or vertical.

Figure 11:
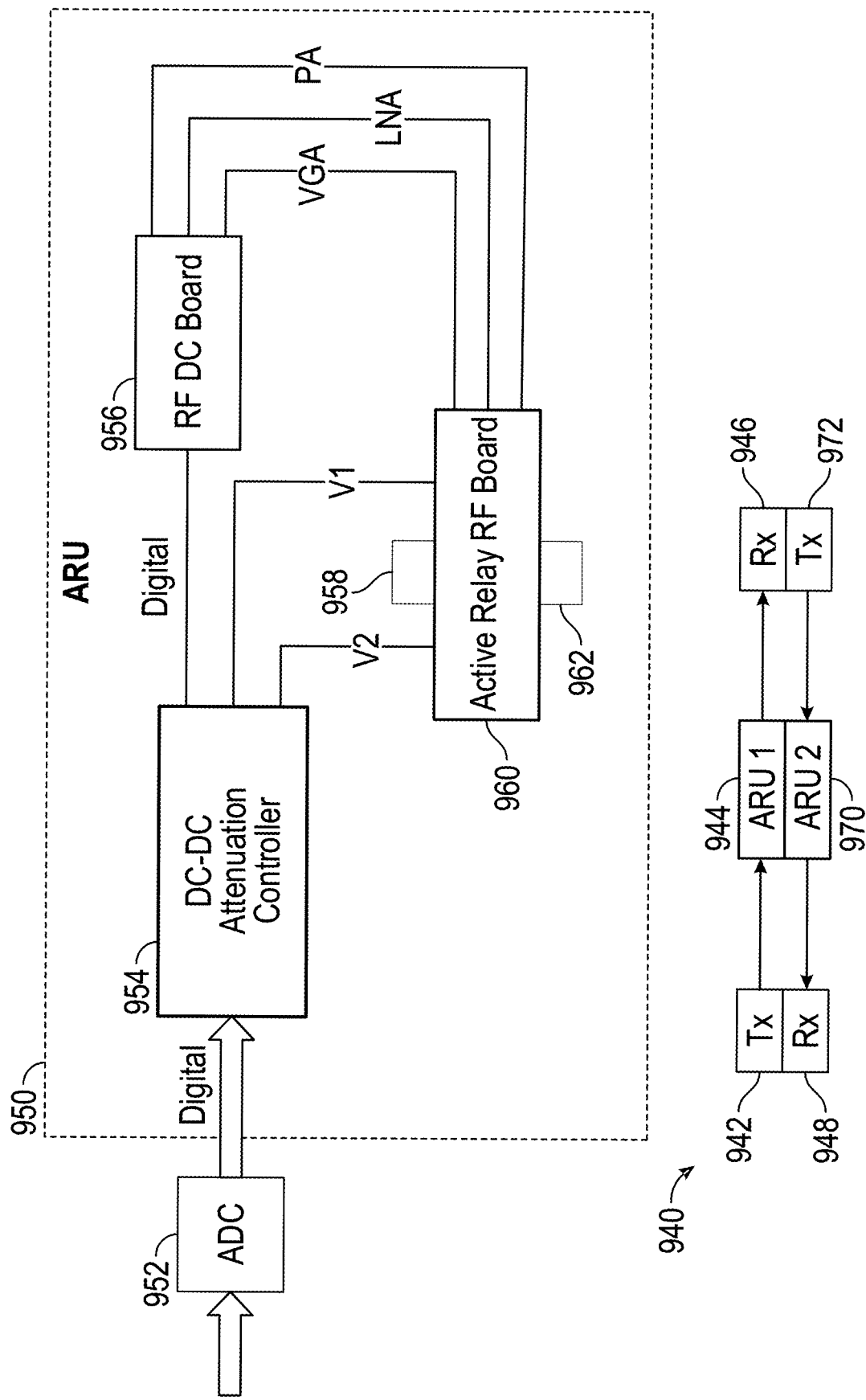
FIG. 11 illustrates a reflectarray device within a vehicle, according to example embodiments of the present invention.

FIG. 11 illustrates, in block diagram form, an edge reflectarray according to example embodiments. The illustrated module is an active relay unit (ARU) 950 is a component of the system 940, having a receive path for the vehicle and a transmit path from the vehicle. The first path receives signals at the receive antenna Rx 948 coupled to ARU 2 970, wherein the signal is amplified and then sent to the transmit antenna Tx 972 to provide the signal to the internal reflectarrays within the vehicle. A second path receives signals at Rx 946 which are processed by ARU 1 944 and then sent to Tx 942. An example block diagram of an ARU 950 is illustrated.

The ARU 950 is coupled between an analog to digital converter (ADC) 952 and RF DC Board 956, wherein digital signal are provided to the board 956 and then output as signals for PA, LNA and VGA to an active relay RF board 960. The digital lines enter the DC-DC & Attenuation Controller 954, which processes the signals an provides digital signals to RF DC Board 956. The controller 954 is further coupled between ADC 952 and the active relay RF board 960 providing voltage controls, V1 and V2, to the board 960, which has an RF in port 958 and an RF output 962.

These various modules are presented to show a variety of solutions for implementing the present inventions. The in-vehicle communication module incorporates edge reflectarrays, internal reflectarrays and an in-vehicle controller to enable the vehicle to access BSs during travel; when active edge relay arrays amplify the received signals to enable the vehicle to process the communications. Additionally, the edge relay arrays are positioned around the device to provide expanded scope during travel. Inside the vehicle, internal reflectarrays may be used to redirect the signals within the vehicle.

Figure 12:
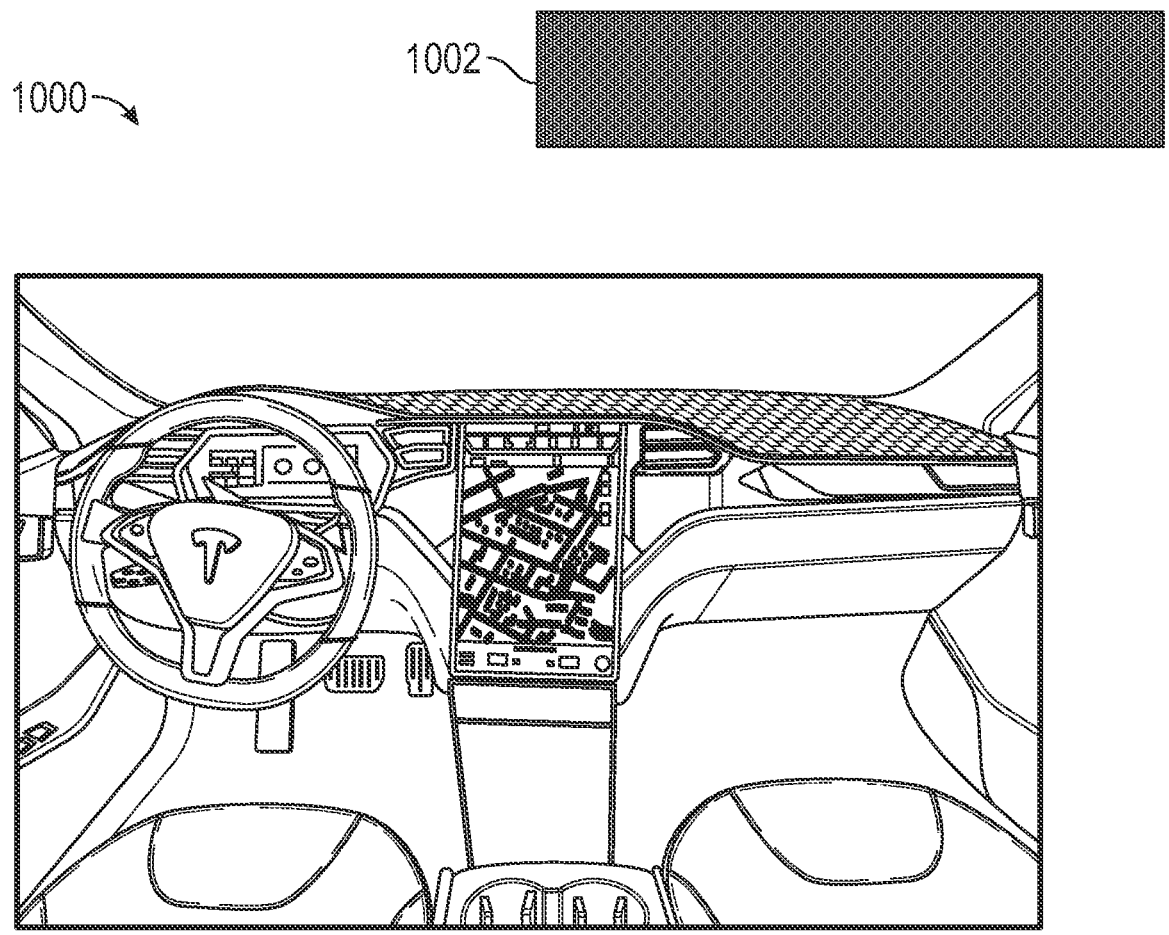
FIG. 12 illustrates an edge reflectarray device, according to example embodiments of the present invention.
Figure 13:
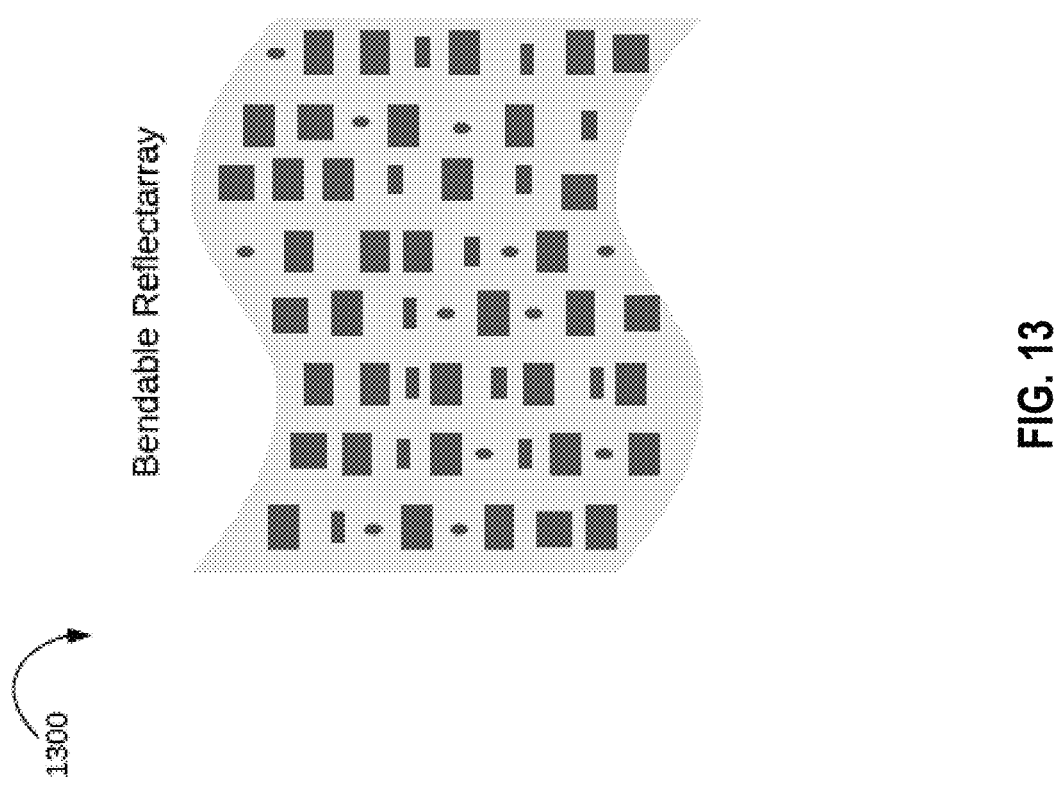
FIG. 13 illustrates a reflectarray device, according to example embodiments of the present invention.

FIG. 12 illustrates an example of placement of a reflectarray or repeater within a vehicle. The vehicle 1000 has a dashboard wherein the reflectarray 1002 is positioned thereupon. In some embodiments, the repeater is positioned within the windshield of the vehicle 1000. An example of a different shape that may form to a vehicle shape is illustrated in FIG. 13. The reflectarray 1300 has a curved shape that is designed according to the available space in a vehicle, the desired range of angular redirection and so forth.

Figure 14:
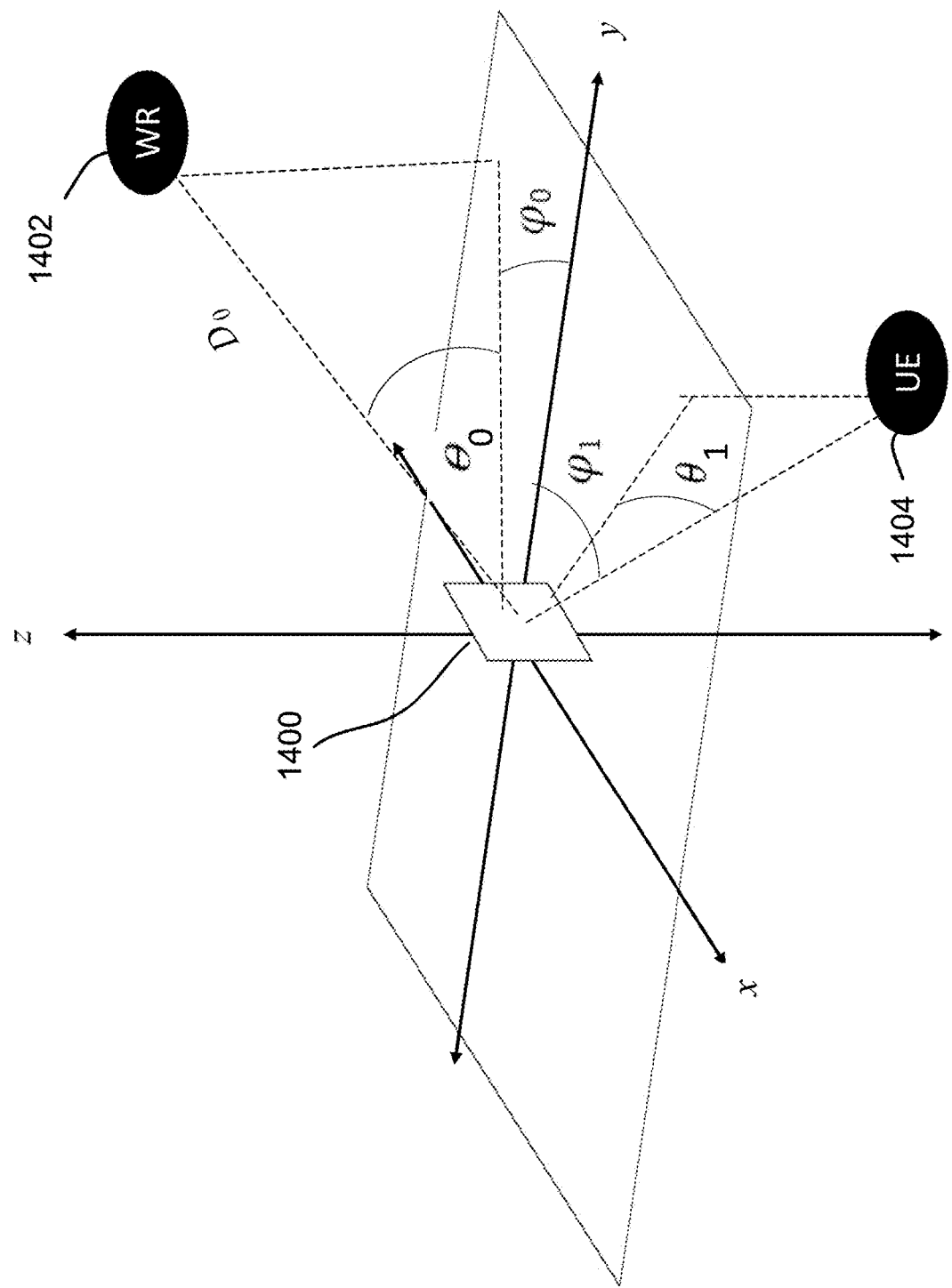
FIG. 14 illustrates a reflectarray geometry, according to example embodiments of the present inventions.

FIG. 14 illustrates the geometry of a wireless radio (WR) 1402 located at Do from a Cartesian (x, y, z) coordinate system positioned in the center of the reflectarray 1400. The reflectarray 1400 is positioned along the x-axis with the y-axis indicating its boresight. The WR 1402 has an elevation angle $\theta_0$ and an azimuth angle $\varphi_0$. Note that determining the geometry setup is a simple procedure involving simple geometrical tools such as, for example, a laser distance measure and an angle measurer. This highlights the ease of setup of reflectarray 1400 and further incentivizes its use when its significant wireless coverage and performance improvements are achieved at low cost with a highly manufacturable reflectarray that can be easily deployed in any 5G environment, whether indoors or outdoors.

The reflectarray 1400 can be used to reflect RF waves from WR 1402 into UE within the 5G network served by WR 1402, such as, for example, UE 1404 located at a distance $D_1$ from the reflectarray 100 with $\theta_1$ elevation and $\varphi 1$ azimuth angles.

Figure 15:
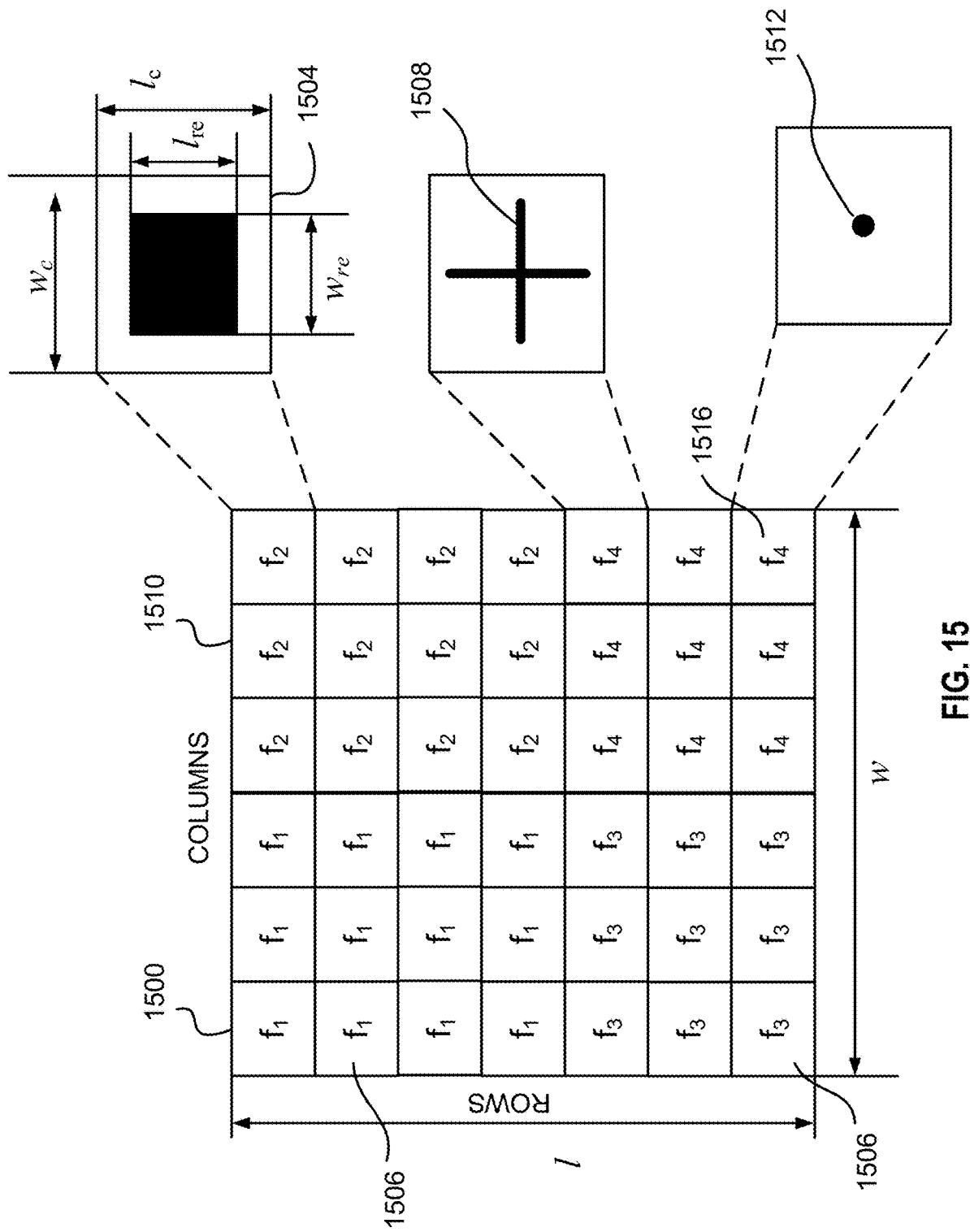
FIG. 15 illustrates a meta-structure (MTS) reflectarray, according to example embodiments of the present inventions.
Figure 17:
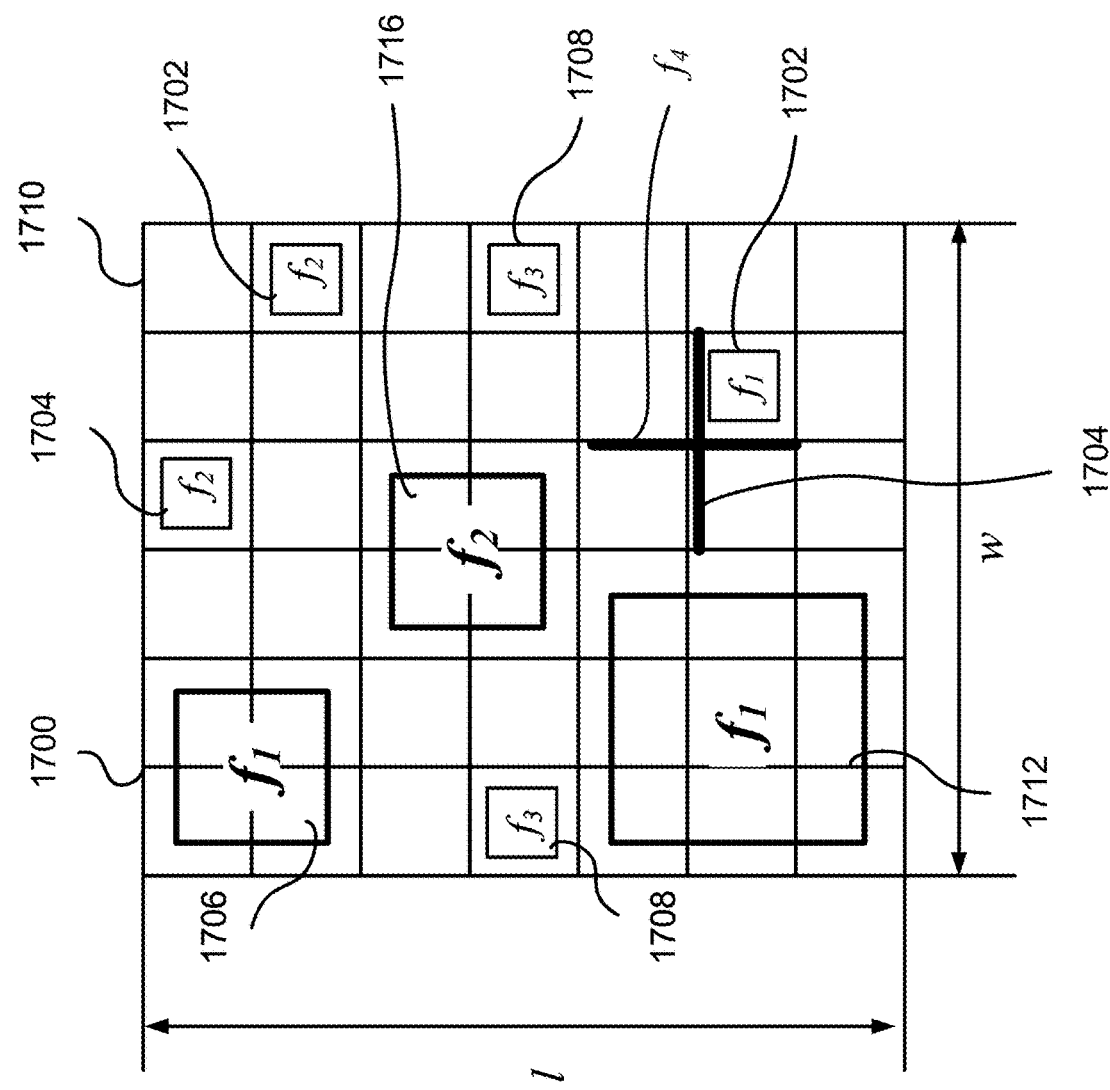
FIG. 17 illustrates a reflectarray operation at various frequencies, according to example embodiments of the present inventions.

FIG. 15 is a schematic diagram of an MTS reflectarray 1500 comprising various different types and sizes of reflector elements, which are each configured to radiate EM energy at a specific frequency ($f_1$, $f_2$, $f_3$, $f_4$), in accordance to various examples. The MTS reflectarray 1500 of FIG. 17 is rectangular in shape and comprises a matrix of MTS cells 1510. The MTS reflectarray 1500 comprises a plurality of reflector elements in the form of MTS reflector elements 1502, 1504, 1506, 1508, 1512, 1516. The MTS reflector elements 1502, 1504, 1506, 1508, 1512, 1516 are of various sizes and are designed to radiate EM energy at various frequencies.

Figure 16:
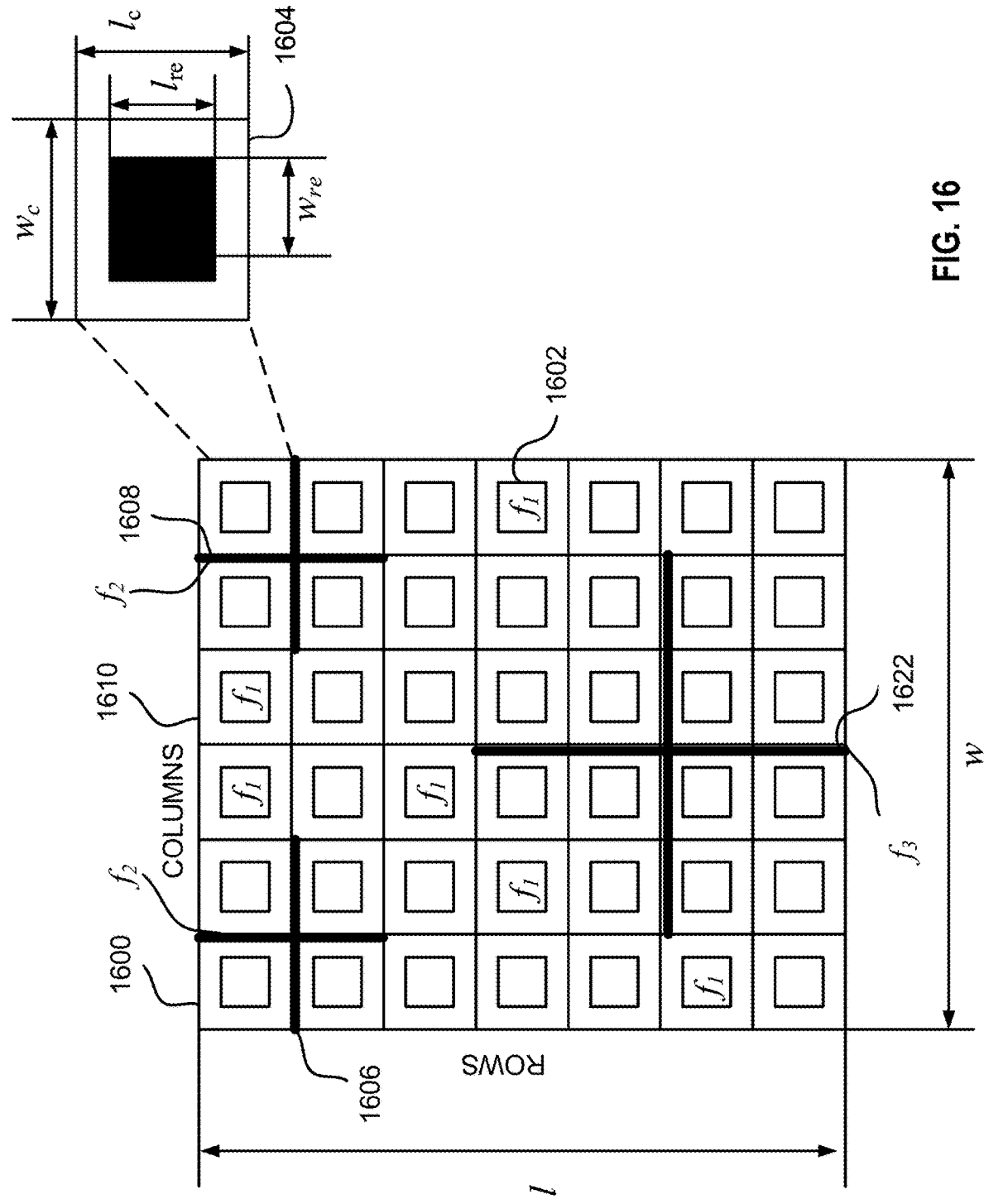
FIG. 16 illustrates a reflectarray having interleaved elements, according to example embodiments of the present inventions.

FIG. 16 is a schematic diagram of an MTS reflectarray 1600, where some reflector elements are interleaved between other reflector elements, in accordance with various examples. The MTS reflectarray 1600 is rectangular in shape and comprises a matrix of MTS cells 1610. In addition, each MTS cell 1610 comprises a respective reflector element 1602 (e.g., an MTS reflector element 1604). For the example of FIG. 16, each of the reflector elements 1602 of the MTS cells 1610 is designed to radiate EM energy at a specific frequency (i.e. at the $f_1$ frequency (e.g., a frequency band referred to as $f_1$)). The MTS reflectarray 1600 is also shown to have several reflector elements in the form of dipole elements 1606, 1608, 1612 of various sizes. These dipole elements 1606, 1608, 1612 are interleaved between the other reflector elements 1602, which are in the form of MTS reflector elements 1604. The interleaving of the dipole elements 1606, 1608, 1612 between other reflector elements 1602 helps to maximize the number of reflector elements that may be designed (configured) on the MTS reflectarray 1600. In this example, dipole elements 1606, 1608 are designed to radiate EM energy at a specific frequency (i.e. at the $f_2$ frequency (e.g., a frequency band referred to as $f_2$)). And, dipole element 1612 is designed to radiate EM energy at a different specific frequency $f_3$. In some applications, it may be desirable for some of the reflector elements to be of different sizes than other reflector elements. Larger sized reflector elements may be designed to radiate higher power, such as higher ERP, RF beams than reflector elements of smaller sizes. In the example of FIG. 16, it may be desirable to generate a RF beam at the $f_3$ frequency to be of a higher power, such as higher ERP, than RF beams generated at the $f_1$ and $f_2$ frequencies. And, it may be desirable to generate a RF beam at the $f_2$ frequency to be of a higher power, such as higher ERP, than RF beams generated at the $f_1$ frequency. As such, since dipole element 1612 is larger than dipole elements 1606, 1608 and reflector elements 1602, dipole element 1612, which is designed to radiate at the $f_3$ frequency, may be designed to generate a higher power RF beam than the RF beams generated by dipole elements 1606, 1608, which are designed to radiate at the $f_2$ frequency, and reflector elements 1602, which are designed to radiate at the $f_1$ frequency. Also, since dipole elements 1606, 1608 are larger than reflector elements 1602, dipole elements 1606, 1608, which are designed to radiate at the $f_2$ frequency, may be designed to generate higher power RF beams than the RF beams generated by reflector elements 1602, which are designed to radiate at the $f_1$ frequency. During operation of the MTS reflectarray 1600, a source (e.g., refer to BS 100 of FIG. 1) transmits a RF signal, such as an incident EM wave, towards the MTS reflectarray 1600. The reflector elements, such as MTS reflector elements 1602 and dipole elements 1606, 1608, 1612, of the MTS reflectarray 1600 receive and reflect the RF signal to generate one or more RF beams.

In one or more examples, the reflector elements may radiate EM energy at different frequencies, in different combinations, than as shown in FIG. 16. In addition, the reflector elements may be designed to radiate EM energy at more or less than three frequencies ($f_1$, $f_2$, $f_3$) as illustrated. Additionally, the reflector elements may be of different reflector element types, such as an MTS reflector element 1604, a dipole element 1606, 1608, 1612, and/or a miniature reflector element 1612 in different combinations, and of different sizes than as shown. In addition, each of the reflector elements of the MTS reflectarray 1600 may be designed (configured) to have a respective reflection phase to generate one or more RF beams.

FIG. 17 is a schematic diagram of an MTS reflectarray 1700 comprising various different types and sizes of reflector elements, which are each configured to radiate EM energy at a specific frequency ($f_1$, $f_2$, $f_3$, $f_4$), in accordance to various examples. The MTS reflectarray 1700 is rectangular in shape and comprises a matrix of MTS cells 1710.

The MTS reflectarray 1700 comprises a plurality of reflector elements in the form of MTS reflector elements 1702, 1704, 1706, 1708, 1712, 1716. The MTS reflector elements 1702, 1704, 1706, 1708, 1712, 1716 are of various sizes and are designed to radiate EM energy at various frequencies. For the example of FIG. 17, MTS reflector elements 1702, 1706, 1712 are designed to radiate EM energy at the $f_1$ frequency (e.g., a frequency band referred to as $f_1$), MTS reflector elements 1704, 1716 are designed to radiate EM energy at the $f_2$ frequency (e.g., a frequency band referred to as $f_2$), and MTS reflector elements 1708 are designed to radiate EM energy at the $f_3$ frequency (e.g., a frequency band referred to as $f_3$).

It should be noted that in some applications, it may be desirable for some of the reflector elements to be of different sizes than other reflector elements. Larger sized reflector elements may be designed to radiate higher power (e.g., higher ERP) RF beams than smaller sized reflector elements. In this example, MTS reflector element 1712 is designed to be larger in size than MTS reflector elements 1702, 1704, 1706, 1708, 1716. And, MTS reflector elements 1706, 1716 are designed to be larger in size than MTS reflector elements 1702, 1704, 1708. As such, the MTS reflector element 1712 may be designed to generate a higher power RF beam than the RF beams generated by the MTS reflector elements 1702, 1704, 1706, 1708, 1716. And, the MTS reflector elements 1706, 1716 may be designed to generate higher power RF beams than the RF beams generated by the MTS reflector elements 1702, 1704, 1708.

In this example, the MTS reflectarray 1700 also comprises dipole element 1714, which is designed to radiate at the $f_4$ frequency (e.g., a frequency band referred to as $f_4$). This dipole element 1714 is interleaved between some of the MTS cells 1710, where one of these MTS cells 1710 comprises MTS reflector element 1702, which is designed to radiate at the $f_1$ frequency. The dipole element 1714 is interleaved between MTS cells 1710 to maximize the amount of available space to accommodate reflector elements on the MTS reflectarray 1700.

During operation of the MTS reflectarray 1700, a source (e.g., refer to BS 100 of FIG. 1) transmits a RF signal (e.g., an incident EM wave) towards the MTS reflectarray 1700. The reflector elements (e.g., MTS reflector elements 1702, 1704, 1706, 1708, 1712, 1716 and dipole element 1714) of the MTS reflectarray 1700 receive and reflect the RF signal to generate one or more RF beams. MTS cells 1710 to maximize the amount of available space to accommodate reflector elements on the MTS reflectarray 1700.

During operation of the MTS reflectarray 1700, a source (e.g., refer to BS 100 of FIG. 1) transmits a RF signal (e.g., an incident EM wave) towards the MTS reflectarray 1700. The reflector elements (e.g., MTS reflector elements 1702, 1704, 1706, 1708, 1712, 1716 and dipole element 1714) of the MTS reflectarray 1700 receive and reflect the RF signal to generate one or more RF beams.

The inventions presented herein provide methods for in-vehicle wireless communication incorporating wireless extension devices to receive wireless signals and redirect these within the vehicle. In some examples, multiple extension devices are configured to operate together. These may be active or passive devices and various combinations thereof. In some examples, multiple extension devices are placed around the perimeter of a vehicle, such as at edge points, to capture wireless signals from multiple directions up to 360° around the vehicle. The placement and structure of the extension devices are designed to provide continuous coverage as the vehicle moves. In some embodiments, the extension devices are repeaters, relays, reflectors, reflect arrays and so forth.

The present inventions provide an in-vehicle communication system having wireless extension devices positioned around a perimeter, or within, a vehicle, the extension devices adapted to communicate with a wireless network and redirect signals within a vehicle and an in-vehicle control (IVC) unit adapted to receive signals from the plurality of edge relay arrays. The IVC unit including a signal detection module and a processing unit. The signal detection module is adapted to activate an extension device(s) in response to a low signal detection at the IVC or other module within the in-vehicle communication system. A reflectarray(s) within the vehicle redirects signals from wireless extension devices to areas within the vehicle. The reflectarray may be a passive or active device. The wireless extension device may be an active device, such as a relay or repeater, which may amplify a receive signal and redirect within the vehicle.

In some embodiments, the wireless extension device includes a downlink receive antenna; an uplink transmit antenna and a downlink active relay coupled to the downlink receive antenna and the uplink transmit antenna, respectively. The wireless extension device may also include an uplink receive antenna, a downlink transmit antenna and an uplink active relay coupled to the uplink receive antenna and the downlink transmit antenna.

In some embodiments the in-vehicle communication system includes a wireless extension device positioned in a frame of a vehicle, such as on the dashboard ceiling, mirror, or windshield of the vehicle.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. An in-vehicle communication system, comprising:
a plurality of wireless extension devices positioned around a perimeter of a vehicle, the plurality of wireless extension devices adapted to communicate with a wireless network and redirect signals within a vehicle;
an internal reflectarray configured to redirect the signals from at least one of the plurality of wireless extension devices to a location within the vehicle,
wherein the internal reflectarray is a passive device, and the at least one of the plurality of wireless extension devices comprises:
a receive antenna,
a transmit antenna, and
an active relay coupled to the receive antenna and the transmit antenna; and an in-vehicle control (IVC) unit adapted to receive the signals from the plurality of wireless extension devices, the IVC unit comprising:
a signal detection module; and
a processing unit.

2. The in-vehicle communication system as in claim 1, wherein the signal detection module activates at least one of the plurality of wireless extension devices in response to a low signal detection at the IVC unit.

3. The in-vehicle communication system as in claim 1, wherein the plurality of wireless extension devices are active relay devices adapted to increase gain of a received signal and redirect a magnified signal within the vehicle.

4. The in-vehicle communication system as in claim 1, wherein the receive antenna is a downlink receive antenna; the transmit antenna is an uplink transmit antenna; and the active relay is a downlink active relay coupled to the downlink receive antenna and the uplink transmit antenna.

5. The in-vehicle communication system as in claim 4, wherein the at least one of the plurality of wireless extension devices further comprises:
an uplink receive antenna;
a downlink transmit antenna; and
an uplink active relay coupled to the uplink receive antenna and the downlink transmit antenna.

6. The in-vehicle communication system as in claim 1, further comprising multiple passive internal reflectarrays.

7. The in-vehicle communication system as in claim 6, wherein one of the plurality of wireless extension devices is positioned in a frame of a vehicle.

8. The in-vehicle communication system as in claim 7, wherein the one of the plurality of wireless extension devices is positioned on a dashboard of the vehicle.

9. The in-vehicle communication system as in claim 7, wherein the one of the plurality of wireless extension devices is positioned proximate a mirror in the vehicle.

10. A wireless extension system, comprising:
an in-vehicle control (IVC) unit;
at least one edge repeater controlled by the IVC unit and operates to amplify and redirect received signals, wherein the at least one edge repeater comprises a receive antenna, a transmit antenna, and an active relay coupled to the receive antenna and the transmit antenna; and
a passive reflectarray positioned to receive redirected signals from the at least one edge repeater, wherein the passive reflectarray is a meta-structure (MTS) device comprising a plurality of different sized MTS elements.

11. The wireless extension system as in claim 10, wherein the passive reflectarray is positioned to receive redirected signals from a second edge repeater.

12. The wireless extension system as in claim 11, wherein a plurality of edge repeaters is positioned on a perimeter of a vehicle.

13. The wireless extension system as in claim 12, wherein the IVC unit further comprises:
a signal detection unit adapted to detect low amplitude wireless signals from a base station; and
a processing unit responsive to detection of signals below a threshold.

14. The wireless extension system as in claim 13, wherein the passive reflectarray comprises a plurality of reflective elements.

15. The wireless extension system as in claim 14, wherein the at least one edge repeater is an MTS device.

16. The in-vehicle communication system as in claim 1, wherein the IVC unit further comprises an angle of arrival (AoA) detection mechanism.

17. The in-vehicle communication system as in claim 1, wherein the passive device has no active components.

18. A wireless extension system, comprising:
an in-vehicle control (IVC) unit positioned in a vehicle;
an edge repeater positioned on a perimeter of the vehicle, wherein the edge repeater is controlled by the IVC unit and configured to amplify and redirect received signals; and
a passive reflectarray positioned to receive redirected signals from the edge repeater, wherein the passive reflectarray is a meta-structure (MTS) device, and wherein the IVC unit comprises:
a signal detection unit adapted to detect low amplitude wireless signals from a base station; and
a processing unit responsive to detection of signals below a threshold.

19. The wireless extension system as in claim 18, wherein the passive reflectarray comprises a plurality of different sized MTS elements.

20. The wireless extension system as in claim 18, wherein the IVC unit further comprises an angle of arrival (AoA) detection mechanism.

* * * * *